US006779027B1

(12) United States Patent
Schunicht et al.

(10) Patent No.: US 6,779,027 B1
(45) Date of Patent: Aug. 17, 2004

(54) INTELLIGENT MANAGEMENT MODULE APPLICATION PROGRAMMING INTERFACE WITH UTILITY OBJECTS

(75) Inventors: Geoffery A. Schunicht, Spring, TX (US); Justin E. York, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/303,308

(22) Filed: Apr. 30, 1999

(51) Int. Cl.[7] ............................................... G06F 15/16
(52) U.S. Cl. .................. 709/223; 709/246; 345/736; 345/744; 370/254; 370/465; 719/319; 719/328
(58) Field of Search ................................ 709/223, 246; 345/734, 735, 736, 744; 370/254, 465; 719/319, 328

(56) References Cited

U.S. PATENT DOCUMENTS

| | | | | |
|---|---|---|---|---|
| 5,491,796 A | * | 2/1996 | Wanderer et al. | |
| 5,729,688 A | * | 3/1998 | Kim et al. | |
| 5,732,218 A | | 3/1998 | Bland et al. | 395/200.54 |
| 5,742,762 A | * | 4/1998 | Scholl et al. | |
| 5,742,768 A | | 4/1998 | Gennaro et al. | 295/200.33 |
| 5,802,530 A | | 9/1998 | Van Hoff | 707/513 |
| 5,887,139 A | * | 3/1999 | Madison, Jr. et al. | |
| 5,909,696 A | * | 6/1999 | Reinhardt et al. | |
| 5,987,513 A | * | 11/1999 | Prithviraj et al. | 709/223 |
| 6,008,805 A | * | 12/1999 | Land et al. | |
| 6,044,382 A | * | 3/2000 | Martino | |
| 6,055,493 A | * | 4/2000 | Ries et al. | |
| 6,061,725 A | * | 5/2000 | Schwaller et al. | |
| 6,085,243 A | * | 7/2000 | Fletcher et al. | |
| 6,101,500 A | * | 8/2000 | Lau | |
| 6,104,868 A | * | 8/2000 | Peters et al. | |
| 6,122,362 A | * | 9/2000 | Smith et al. | |
| 6,134,581 A | * | 10/2000 | Ismael et al. | |
| 6,157,927 A | * | 12/2000 | Schaefer et al. | |
| 6,170,005 B1 | * | 1/2001 | Meandzija | |

(List continued on next page.)

OTHER PUBLICATIONS

*AdventNet SNMPv3–Introduction–SNMP and MIBs–SNMP and MIB Overview,* AdventNet, Inc. (1996–99) (pp. 1–2).

(List continued on next page.)

*Primary Examiner*—Rupal Dharia
*Assistant Examiner*—Stephen Willett

(57) ABSTRACT

An intelligent management module application programming interface that facilitates use of network management software in multiple operating environments is provided. The intelligent API provides an interface that facilitates development of cross-platform software to support managed devices on a network. The intelligent API permits such software to work in a variety of operating environments with minimal code per device. The interface additionally provides features which minimize the development effort needed before a new device is supported by the management module. Features include a mechanism for engaging an SNMP session in all operating environments supported by the network management software. Additionally, a mechanism for easily adding buttons, with behavior dependent on the particular operating environment, to a user interface, as well as providing a help button for all environments, is provided. The intelligent management module API additionally provides several mechanisms to simplify the process of dynamically creating and updating graphical images representative of the managed device onto a user interface, resulting in a real-time view of the device by the user. These features further provide a consistent look and feel for the presentation of different managed devices on the user interface.

11 Claims, 21 Drawing Sheets

U.S. PATENT DOCUMENTS

| | | | |
|---|---|---|---|
| 6,199,068 B1 * | 3/2001 | Carpenter | |
| 6,212,560 B1 * | 4/2001 | Fairchild | 709/223 |
| 6,219,708 B1 * | 4/2001 | Martenson | |
| 6,226,788 B1 * | 5/2001 | Schiening et al. | |
| 6,269,397 B1 * | 7/2001 | Pirhonen | 709/223 |
| 6,272,537 B1 * | 8/2001 | Kekic et al. | 709/223 |
| 6,282,568 B1 * | 8/2001 | Sondur et al. | 709/223 |
| 6,292,829 B1 * | 9/2001 | Huang et al. | 709/223 |
| 6,304,877 B1 * | 10/2001 | LeBlanc | |
| 6,349,333 B1 * | 2/2002 | Panikatt et al. | 709/223 |
| 6,356,931 B2 * | 3/2002 | Ismael et al. | |
| 6,360,258 B1 * | 3/2002 | LeBlanc | 709/223 |
| 6,457,048 B2 * | 9/2002 | Sondur et al. | |
| 6,470,384 B1 * | 10/2002 | O'Brien et al. | 709/223 |
| 6,480,901 B1 * | 11/2002 | Weber et al. | 709/246 |
| 6,487,590 B1 * | 11/2002 | Foley et al. | 709/223 |
| 6,510,466 B1 * | 1/2003 | Cox et al. | 709/223 |
| 6,611,867 B1 * | 8/2003 | Bowman-Amuah | |
| 6,633,848 B1 * | 10/2003 | Johnson et al. | |
| 2001/0032259 A1 * | 10/2001 | Herrmann et al. | |
| 2001/0039615 A1 * | 11/2001 | Bowker et al. | |

OTHER PUBLICATIONS

*Network Management Meets the Web,* NetworkMagazine.com, Steve Steinke, (11/97) (pp. 1–9) (www.networkmagazine.com/magazine/archive/1997/11/9711cov1).

*In–building Nets Seek Unifying Force,* EETimes, Issue 1035, Peter Dudley, (Nov. 16, 1998) (pp. 1–3) (www.techweb.com/se/directlink.cgi?EET19981116S0067).

*An Introduction to SNMP,* Anixter Technical Library (no date) (pp. 1–12) (www.anixter.com/techlib/buying/network/snmp1).

*Netelligent 5708 TX Dual–Speed Ethernet Switch—User Guide, Ch. 4,* Compaq Computer Corp., ($1^{st}$ Ed., 05/97) (38 pp.).

*Network Management Overview,* White Paper, Compaq Computer Corp. (09/96) (pp. 1–13).

*AdventNet SNMP API Summary* (no date) (pp. 1–3) (www.adventnet.com/products/snmpv1/help/apisummary).

*AdventNet SNMPv3 Release 2 Release Notes* (1996–98) (pp. 1–4) (www.adventnet.com/products/snmpbeans/snmpv3/help/release_notes).

*SNMP–Simple Network Management Protocol* (no date) (pp. 1–13) (www.rad.com/networks/1995/snmp/snmp).

*Java Dynamic Management™ Kit: A White Paper,* Sun Mircosystems, Inc., (no date) (pp. 1–13) (www.sun.com/software/java–dynamic/wp–jdmk).

*A Simple Network Management Protocol (SNMP),* J. Case et al. (05/90) (pp. 1–37) (www.sunsite.auc.dk/RFC/rfc/rfc1157).

\* cited by examiner

INTELLIGENT MANAGEMENT MODULE APPLICATION PROGRAMMING INTERFACE WITH UTILITY OBJECTS

BACKGROUND OF THE INVENTION

1. Field of the Invention

The invention relates generally to application programming interfaces, or APIs, for providing network management capability and, more particularly, to implementing a management module intelligent API that permits network management software to work in various operating environments.

2. Description of the Related Art

In addition to performing its intended purpose, software development today defines the environment under which software runs. In the 1980s, "compatibility" was a key concern for software developers. A computer whose hardware could not successfully run any software that ran on an IBM PC AT was not "AT-compatible." Thus, the aggregation of AT-compatible systems in the marketplace, for example, readily defined a platform around which a software developer could write an application program.

Today, software applications are so tightly coupled to operating system software that "compatibility" has been supplanted with the watchwords "operating environment." Now, the target platform for the application programmer is not just the hardware (the CPU and system board), but may include the operating system, network, and possibly browser software as well. Even other application programs may affect the operating environment and thus demand consideration by a software developer.

Further, obsolescence quickly diminishes the life of an application program that cannot readily be adapted to new hardware that arrives on the market. With the capability to download software upgrades off a company's web site, application developers can no longer hide behind the bureaucracy of the shipping department in failing to quickly support new hardware.

Partly as an acknowledgement that the operating environment of a consumer cannot be defined entirely, and due to the complexity of application programs generally, many software programs today are structured so that they succeed in a variety of operating environments as well as anticipate new hardware that may emerge. An application programming interface, or API, is a popular tool for such structuring of software applications. As the name suggests, it "interfaces" the core application code with the rest of the operating environment. APIs generally include specifications or protocols for their use; programs written according to the protocol may have a similar interface to the end user, for example. APIs also may include routines, libraries, or other tools which minimize duplicity of effort for various developers who need to perform similar functions. Thus, APIs are tools that typically permit new development to support new operating systems, to support new hardware, or to add new software features to existing application programs. Operating systems such as Microsoft Windows provide an API to enable programmers to write applications that are consistent with the operating environment and which provide a consistent user interface.

One type of application program, network management software, is particularly suited to such interfaces. For one thing, the network management software must support a huge variety of networkable devices. Ideally, a network management application supports virtually every hardware device that may be managed on a network. Accordingly, network management software may include a variety of application programming interfaces.

SUMMARY OF THE INVENTION

Briefly, the illustrative system provides an intelligent application programming interface, or API, between management modules and the operating environments that may be supported by a network management program. The API provides an interface so that each management module, which supports a distinct network manageable device, does not have to determine the environment from which an SNMP request originates. Instead, the management module can focus upon sending and responding to SNMP commands in a standard manner. Further, the intelligent management module API provides tools which simplify the work involved in building a user interface, including buttons and graphical representations of managed devices. Using these tools, a consistent look and feel is provided to the user irrespective of the device being managed by the management module.

The management module API includes a number of utility objects. One, an intelligent SNMP interface, translates requests from a number of environments into a standard format which is comprehensible to each management module. Using this mechanism, each management module can expect all SNMP requests to follow a particular format, regardless of the environment from which the request originated. Further, the management module request is issued to the SNMP interface, again, regardless of the destination environment. Instead, the SNMP interface determines the current operating environment, translates the SNMP request into an environment-ready format, and sends the request to the network management software.

This modularization of the SNMP support eliminates the need to rewrite existing code for each management module. A management module can be written once to support many potential operating environments. The intelligent SNMP interface thus simplifies the job of management module development.

A second utility object, an intelligent button object, provides a mechanism for management module developers to readily define buttons for the user interface, also independent of the operating environment. The mechanism further includes the ability to "hide," or not display, a button when it is not supported in a certain operating environment. Closely related to the intelligent button object, an intelligent multi-target help button enables management module developers to provide help features pertinent to a device, again regardless of the operating environment.

Additionally, the intelligent management module API provides an intelligent image loading utility object. This feature permits the management module developer to load a graphic image to the user interface simply by specifying the name of the file holding the image. Because the location of a graphical image may differ, depending upon the operating environment, the intelligent image loader performs the operations necessary to determining where the image is located, removing this overhead from management module development.

Related to the intelligent image loader, another utility object, a dynamic graphic image layering object, provides a framework for providing graphical images to the user interface. This utility object simplifies the process of generating graphic images of a device for the management module developer, readily permits updates to be made to the image as desired, and enables the graphic to be updated dynamically, based upon SNMP responses.

The intelligent management module API also provides an SNMP indexing class to simplify the development of reusable dialogs in the user interface. The SNMP indexing class receives SNMP MIB data as input and is used to present a dialog containing either a single or multiple rows of MIB data, depending upon the user request. The SNMP indexing class keeps the management module developer from having to write duplicative code for the different types of outputs, thus allowing for a consistent look and feel for the display of information for managed devices generally.

Finally, the intelligent management module API includes an SNMP evaluator object. This feature simplifies the creation and update of the part of the graphical display which is based upon SNMP-gathered information. The management module developer specifies the portion of the display which is based on MIB information for the device and supplies either Boolean or bit mask operations to be performed. The SNMP evaluator object retrieves the information from the agent of the device, performs either Boolean or bit mask calculations on the retrieved information, as specified, and loads and displays the updated graphic image based upon the results of the evaluations. The SNMP evaluator object thus provides dynamic graphical updates of SNMP MIB data.

Other applications for the intelligent management module API are possible. The intelligent management module API addresses the support of multiple operating environments by network management software, it provides features which reduce the complexity of management module development generally, and it gives the user interface for the network management software a consistent look and feel.

BRIEF DESCRIPTION OF THE DRAWINGS

A better understanding of the present invention can be obtained when the following detailed description of the preferred embodiment is considered in conjunction with the following drawings, in which:

FIG. 12b is a screen shot of CNMS illustrating how the intelligent button object supports a number of button objects in a Windows operating environment, some buttons being distinct from those supported in the web browser operating environment, as seen in FIG. 12a;

DETAILED DESCRIPTION OF PREFERRED EMBODIMENT

A network management application describes network management models and their use in web environments in commonly assigned U.S. patent application Ser. No. 09/231, 286 entitled "Interactive Web-based Network Management" to Geoffery A. Schunicht, Justin E. York, Peter A. Hansen, and Charles W. Cochran, filed on Jan. 15, 1999, which is hereby incorporated by reference as if set forth in its entirety.

A second application describes integrating software written in a high-level programming language with Java-based code, particularly to support graphical user interfaces. This commonly assigned U.S. Pat. No. 6,675,371 is entitled "Java and Native Application Window Integration" to Justin E. York and Geoffery A. Schunicht, and was filed concurrently, which is also hereby incorporated by reference as if set forth in its entirety.

The illustrative system provides a method for interfacing between network management software which manages devices on a network and the product management modules supporting the devices. For purposes of explanation, specific embodiments are set forth to provide a thorough understanding of the present invention. However, it will be understood by one skilled in the art, from reading the disclosure, that the invention may be practiced without these details. Further, although the embodiments are described in terms of Compaq's CNMS software product, most, if not all, aspects of the system illustrated may be applied to other network management products as well. Moreover, well-known elements, devices, process steps, and the like, are not set forth in detail in order to avoid obscuring the invention.

Figure 1:
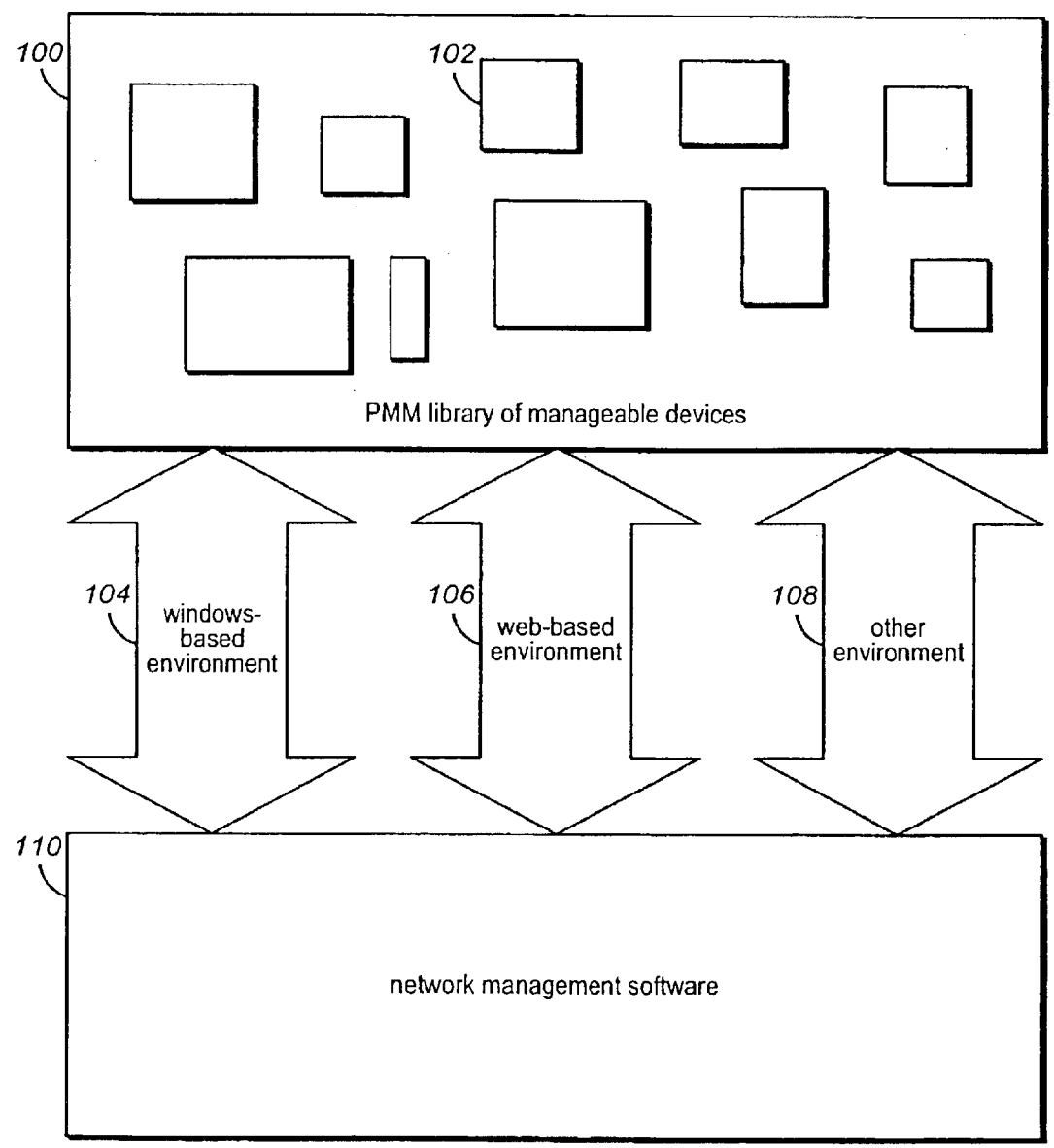
FIG. 1 is a block diagram showing the relationship between product management modules and network management software according to one embodiment.

FIG. 1 illustrates one organization of a network management environment. First, a group of product management modules 100, or PMMs, is shown. A distinct product management module 102 is created for each device supported by the network management software 110. In a known environment, each PMM 102 is written such that the network management software 110 can effectively communicate with the PMM 102 to manage the particular device supported by the PMM 102. If a single operating environment, such as Windows, is used, both the PMM 102 and the network management software 110 are typically written in the same programming language. The use of the term "PMM" throughout this disclosure should be understood to encompass management modules, which might also be termed software plug-ins.

Ideally, though, the PMM 102 can be used in many different environments. In the disclosed embodiment, the PMM 102 is written in the Java programming language. Java is an object-oriented programming language that is designed to be platform-independent. PMMs written using Java are portable to a variety of operating environments.

Thus, in FIG. 1, more than one operating environment is shown interfacing between the network management software 110 and the PMMs 100. The environment may be a Windows-based environment 104, a web-based environment 106, or some other environment 108. As is further developed, below, SNMP commands, help requests, display of images to the user interface, and so on, are processed in one manner when a Windows-based environment 104 is used and in a different manner when a web-based environment is used. Thus, in order to process these various requests under Windows, on a web browser, and under any other environment, a PMM 102 must support each of these environments.

Figure 2:
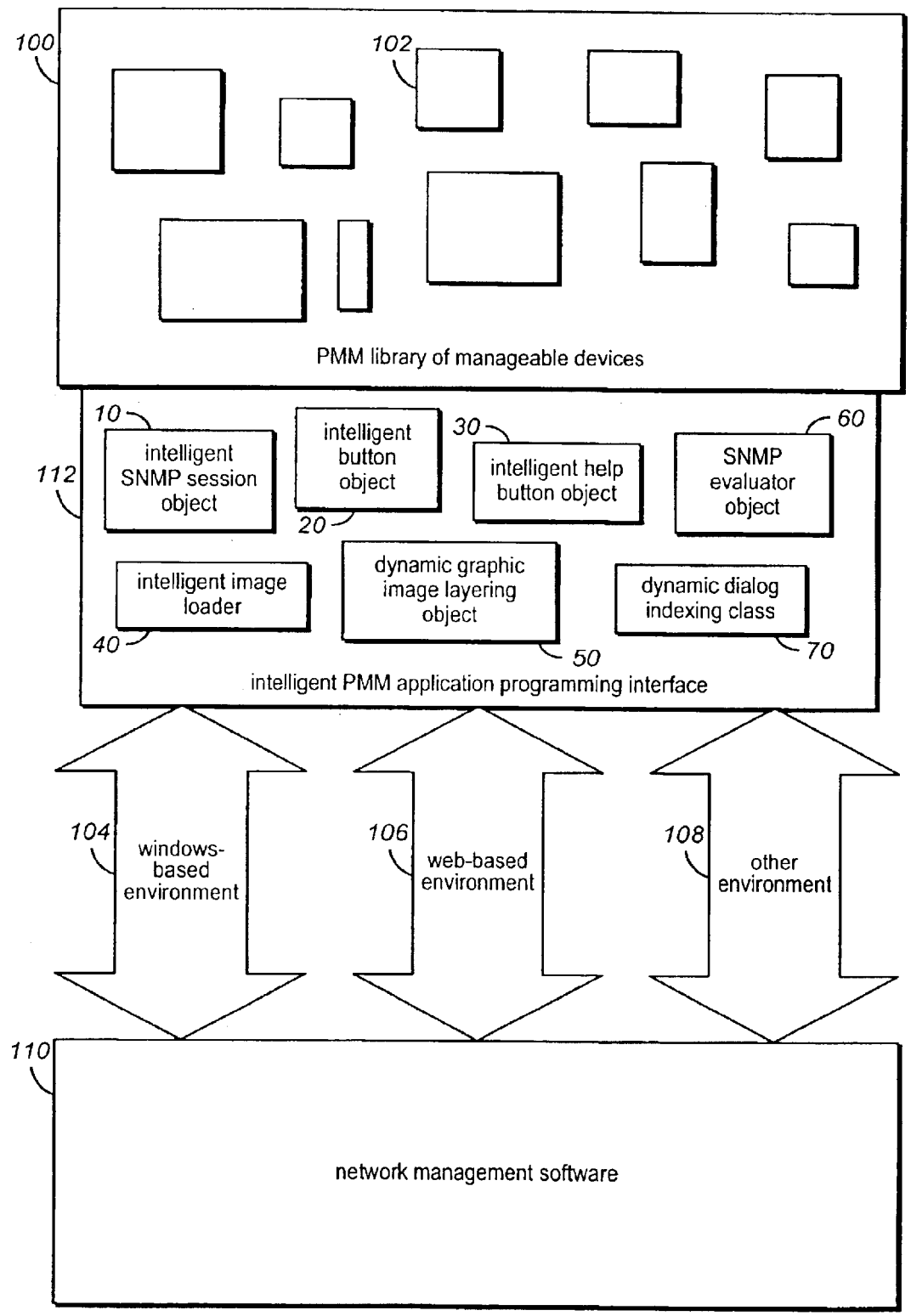
FIG. 2 is a block diagram showing an intelligent PMM API with some of its applications as well as its relationship to the elements of FIG. 1 according to one embodiment.

FIG. 2 depicts an intelligent PMM application programming interface 112. The intelligent PMM API 112 enables a PMM 102 to work in different environments without having to add new code each time a new environment is supported by the network management software 110. In other words, the intelligent API 112 provides a framework to unify all PMM development into a single code base.

The intelligent PMM API 112 is coupled between the PMMs 100 and the environments 104, 106, and 108 of FIG. 1. The intelligent PMM API 112 provides features which keep the PMM 102 from having to determine its operating environment. The intelligent API 112 also permits a consistent interface, regardless of the operating environment of the user. Further, the intelligent API 112 is flexible in that new features can be readily added to a PMM, new operating environments can be supported by the PMMs, and new devices can be easily supported.

The intelligent PMM API 112 further provides features which simplify development of images to be displayed to a graphical user interface, or GUI, irrespective of the operating environment. Further, the intelligent PMM API 112 allows some GUI features to be operating system-dependent, as desired.

FIG. 2 additionally shows some of the features of the intelligent PMM API 112. The features shown include an intelligent SNMP session object 10, an intelligent button object 20, an intelligent help button object 30, an intelligent image loader 40, a dynamic graphic image layering object 50, an SNMP evaluator object 60, and a dynamic dialog indexing class 70. Each feature, known herein as utility objects, is described in turn, below.

Before discussing the various features of the intelligent PMM API 112, a discussion of network management software and how it interacts with the devices it manages may be helpful. One network management program is Compaq Networking Management Software, or CNMS, a product of Compaq Computer Corporation, of Houston, Tex., assignee of this patent. CNMS provides network support for a large number of devices under a Microsoft Windows operating environment. Compaq's 5226A Ethernet Switch and 5411 Gigabit Switch are examples of devices supported by CNMS.

Each device is supported by a distinct PMM. The PMMs are designed to run in a number of operating environments. For example, CNMS runs under Windows, but, from a web browser, a user can also access CNMS on a web server. The PMMs may be used in either environment.

Some customers purchase network devices from Compaq, but use network management software from other suppliers, such as HP OpenView, a product of Hewlett Packard Corporation of Palo Alto, Calif. For these customers, each network device includes a PMM that can be used with its HP OpenView software. Finally, some customers may purchase network products without having any network management software, as their need to manage the devices is minimal. The PMMs are thus designed to work in a stand-alone operating environment as well.

To support a number of operating environments, Compaq designed an application programming interface for each operating environment called a PMM Environment Personality, or PEP. The purpose of each PEP is to provide an interface between the PMM and a session of some network management object or product, such as a Windows-based CNMS session, a web-based CNMS session, or a stand-alone session (where SNMP capability is separate from the network management software).

By organizing development in this way, PMMs can readily run in many environments. For example, if Compaq wishes to support another network management product, such as Sun Net Manager, a product of Sun Microsystems of Palo Alto, Calif., the developers simply write a new PEP for Sun Net Manager. The new PEP interfaces each PMM, and, accordingly, each supported device, with the new network management product.

Figure 3:
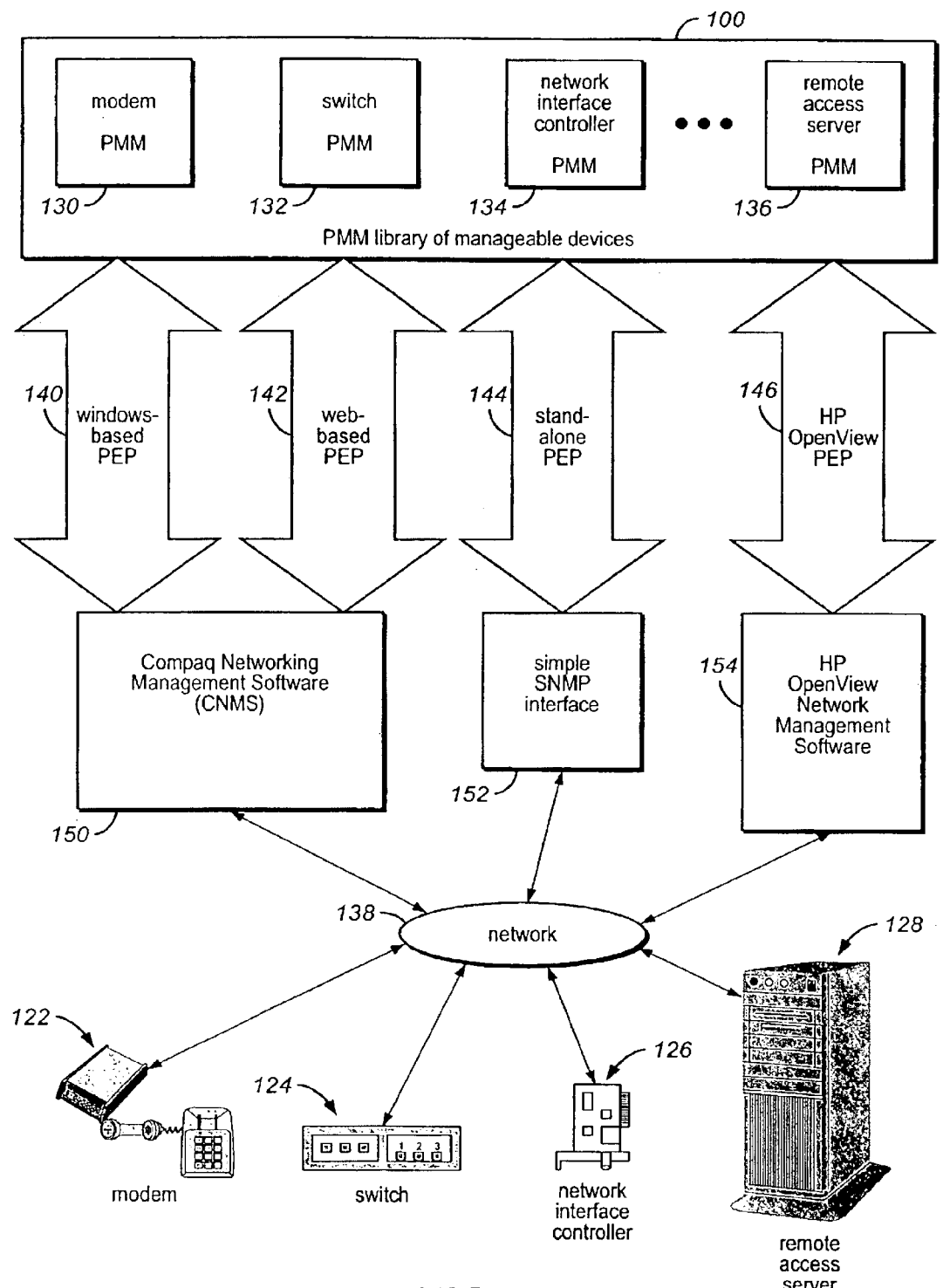
FIG. 3 is a block diagram showing various devices that are managed on a network, some possible operating environments, and a sample of interfaces to the user of the devices.

FIG. 3 illustrates an organization of PEPs to support PMMs for network management products. First, a PMM library of manageable devices 100 is shown. In this context, "library" simply stands for a repository of PMMs. In FIG. 3, the library 100 is made up of a modem PMM 130, a switch PMM 132, a network interface controller, or NIC, PMM 134, and a remote access server PMM 136. The library 100 is expandable to further include a large number of other network manageable devices, not shown.

Also shown in FIG. 3 are corresponding devices supported by the PMMs. Each device is located somewhere on a network 138. First, a modem 122 is shown connected to the network 138. The modem may be a Universal Serial Bus, or USB, modem, a Peripheral Component Interconnect, or PCI, modem, a cellular modem, or a number of other SMNP-manageable modem types. Next, a switch 124 is shown connected to the network 138. The switch 124 may be a Fast Ethernet Switch, a Gigabit Switch, a Digital Network Switch, a Dual-speed Switch, or a number of other manageable switches.

A network interface controller, or NIC 126, is also shown coupled to the network 138. The NIC 126 may be an Ethernet controller, a token ring controller, a fiber distributed data interface, or FDDI, controller, a personal computer memory card international association, or PCMCIA, controller, or a combination card, such as a combination NIC/modem controller. Finally, FIG. 3 shows a remote access server 128 coupled to the network 138. The remote access server 128 may include a variety of servers from a number of vendors.

The PMM library of manageable devices 100 interfaces to a number of PMM Environment Personalities (PEPs) in FIG. 3. Each PMM uses whichever PEP is active to communicate over the network 138 to its corresponding device using a protocol known as SNMP, described in more detail, below. First, a Windows-based PEP 140 is shown coupled to CNMS 150. Another PEP, a web-based PEP 142, is also coupled to CNMS 150, for web-based operation of CNMS 150.

A stand-alone PEP 144 is also available to the PMM library of manageable devices 100 for those customers who perform no network management. Using the stand-alone PEP 144, a simple SNMP interface 152 may be the mechanism by which the customer interacts with a manageable device. (The simple SNMP interface 152 may be nothing more than an SNMP stack, which is further described below.) Finally, an HP OpenView PEP 146 is coupled to a proprietary network management software 154 for that vendor. Using the HP OpenView PEP 146, the network management software 154 is able to access device PMMs in the PMM library of manageable devices 100.

To better understand how the elements of FIG. 3 cooperate, a review of network management may be helpful. Briefly, network management involves a dialogue between a network management application program, or manager, and the "agents" of the devices on the network being managed. One standard for communicating between managers and agents is known as a simple network management protocol, or SNMP. SNMP includes a very limited set of management commands and responses. These commands enable the manager to retrieve information from or send information to a database, known as a management information base, or MIB, which each agent controls. The submission of SNMP commands from manager to agent and vice-versa, as well as the retrieval of SNMP responses from these same entities is accomplished using protocol data units, or PDUs. The PDU includes an IP address identifying the intended SNMP agent, an identification of the MIB portion being sought, and the SNMP command being issued.

The most common SNMP commands are SNMP "get" and "set" commands. SNMP "get" is analogous to a memory "read" command. The command directs the agent of a managed device to retrieve some information from the MIB. Likewise, the SNMP "set" command operates like a memory "write" command by directing the agent of the device to update the MIB with new data. A third SNMP command, "get next" permits subsequent retrieval, following a SNMP "get" command, of potentially large amounts of data from the MIB.

Because SNMP commands are sent across a network to a managed device, the commands are transported to and from the managed device under an agreed-upon protocol. One well-known protocol is known as a user datagram protocol, or UDP. The software that processes the UDP protocol, as well as other protocols, is known in network parlance as a stack.

In the disclosed embodiment, the stack is part of the network management software. Thus, in order to issue an SNMP request, each PMM must first access the stack that is part of the network management program.

Intelligent SNMP Session Object

Both the PMMs 100 and the network management software 110 may perform SNMP requests for a device. The network management software 110 has its own SNMP stack while, in the disclosed embodiment, each PMM has no SNMP stack. An example of a suitable stack is an SNMP stack available from AdventNet Inc., of Edison, N.J. Because an SNMP stack is necessary to issue an SNMP request, the PMM making a request must first "obtain" access to an SNMP stack, ideally from the network management software 110.

However. access to the network management software 110 occurs through one of the PEPs, as described above. Thus, in order to access an SNMP stack, the PMM must be aware of the current operating environment.

To illustrate, suppose the switch PMM 132 of FIG. 3 issues an SNMP "get" command to the switch 124. If the SNMP request is Windows-based, access to the CNMS 150 and its SNMP stack (not shown) occurs through the Windows-based PEP 140. Alternatively, if the SNMP request is web-based, access to the CNMS 150 and its SNMP stack (not shown) instead is routed through the web-based PEP 142, as designed. So, the switch PMM 132 uses distinct code portions, one for the web-based environment, the other for the Windows-based environment, even though the same SNMP command is being processed under each environment.

Looking back to FIG. 2, an intelligent SNMP session object 10 is shown as part of the intelligent PMM API 112. The intelligent SNMP session object 10 keeps the PMM 102 from having to be aware of the current operating environment as well as having to maintain separate code portions for these different environments. Instead, when the PMM 102 directs a network management software 110 to make an SNMP request to a device, the intelligent SNMP session object 10 intercepts the request, determines the current operating environment, and creates an object which provides a gateway between the PMM 102 and the stack which is part of the network management software 110. The network management software 110 then submits the SNMP request to the device, after which a response is stored in the stack of the network management software 110. The intelligent SNMP session object 10 then translates the response to a standard format. The response, for example, may be broken into elements to be stored as a vector for use in building a response string readable by a PMM. The response string is sent to the PMM 102.

A number of benefits can flow from providing the intelligent SNMP session object 10. For one thing, each PMM 102 may be used in multiple operating environments, and yet does not include environment-specific queries and dedicated code. Secondly, such an organization encourages expanding the network management software 110 to support new devices. Finally, a consistent interface is provided for SNMP responses, independent from the environment inside which the SNMP request originated.

Figure 4:
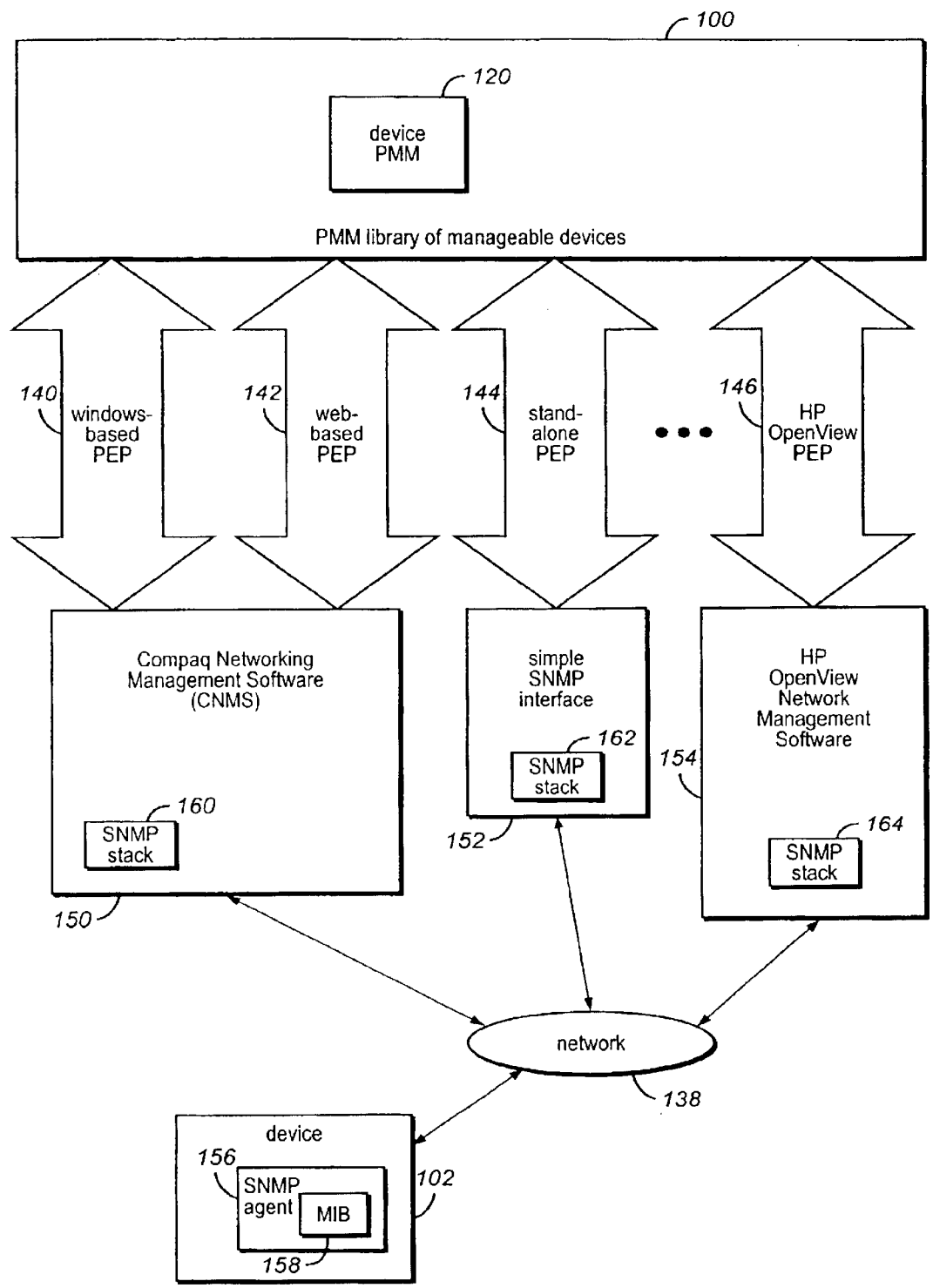
FIG. 4 is a block diagram illustrating how a device PMM accesses a stack according to the operating environment in order to execute SNMP commands to the agent of a device.

FIG. 4 illustrates a situation faced by the switch PMM 132 or other PMM of FIG. 3. First, a device 102 is shown, including an SNMP agent 156 and a MIB 158. Recall that the MIB 158 is like a database of information relevant to the device 102 and the SNMP agent 156 communicates MIB 158 information to whatever entity makes an SNMP request.

The device 102 is connected somewhere on a network 138, shown at the bottom of FIG. 4. At the top of FIG. 4, a device PMM 120 is shown, one member of the PMM library of manageable devices 100 introduced in FIG. 1. The device PMM 120 may perform many SNMP requests to the SNMP agent 156 of the device 102. The device PMM 102 thus interfaces with one of a variety of possible operating environments.

To issue an SNMP command, the device PMM 120 needs access to an SNMP stack. FIG. 4 shows the CNMS program 150, which contains an SNMP stack 160. Likewise, the HP OpenView program is shown with an SNMP stack 164. A simple SNMP interface 152 can also have an SNMP stack 162.

As shown in FIG. 4, the device PMM 120 interfaces to potentially many different SNMP stacks. Although a single device PMM 120 is shown supporting a single manageable device 102, the network management environment conceivably supports thousands of managed devices, and thus thousands of PMMs.

Figure 5:
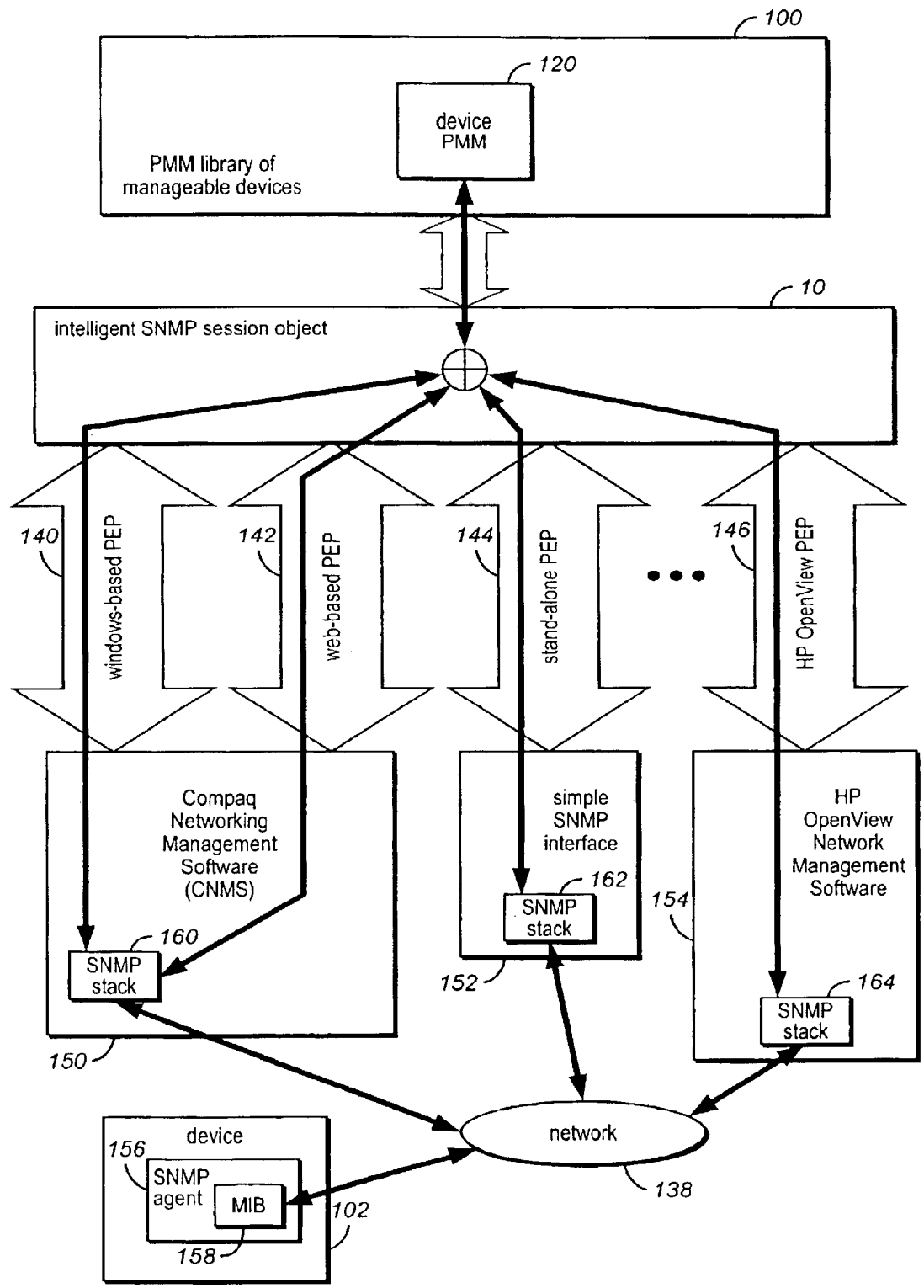
FIG. 5 is a block diagram illustrating how the intelligent SNMP session object of the illustrative system routes the proper stack to the device PMM to process SNMP commands.

FIG. 5 shows how an intelligent SNMP session object 10 provides access to an SNMP stack by the device PMM 120. In the disclosed embodiment, the intelligent SNMP session object 10 is called an SnmpSession object. As is explained in further detail, below, the intelligent SNMP session object 10 keeps the device PMM 120 from having to determine which stack it can use to process an SNMP request. Instead, the intelligent SNMP session object 10 provides a gateway to various native SNMP stacks that can then service the SNMP requests. The gateway also receives the responses from the various SNMP stacks and converts them all into a single format. Further, the intelligent SNMP session object 10 permits the PMM developer to leverage these stacks, rather than having to write a distinct SNMP stack for each PMM. It should be understood that the disclosed SNMP stack constitutes code.

Because the intelligent SNMP session object 10 is created using the Java programming language in the disclosed embodiment, a quick review of the nomenclature of the Java language may be helpful. First, classes are the basic programming units of Java. In short, a class is a definition of methods and attributes that can be used to create objects of certain types. The objects perform operations using methods and store states using attributes. Every object is an instance of some class. Thus, a class instantiates, or causes to be created, some object, which performs the function intended by the programmer.

In the disclosed embodiment, an SnmpSession class is used by the PMM 120 for SNMP communication. The SnmpSession class is updated to support new PEPs as they are created. When a PMM 120 makes an SNMP request, such as an SNMP "get," the SnmpSession class routes the request through the proper SNMP gateway for the PEP inside which the PMM is currently running.

The intelligent SNMP session object 10 reduces the need for the PMM developers to do special work to decode various responses from various SNMP providers. An SNMP provider here refers to network management software or interface having an SNMP stack. Further, the intelligent SNMP session object 10 preserves the individual nature of each environment by permitting each network management software or interface to maintain its SNMP stack in its preferred manner, rather than identically to other network management software or interfaces.

Figure 6:
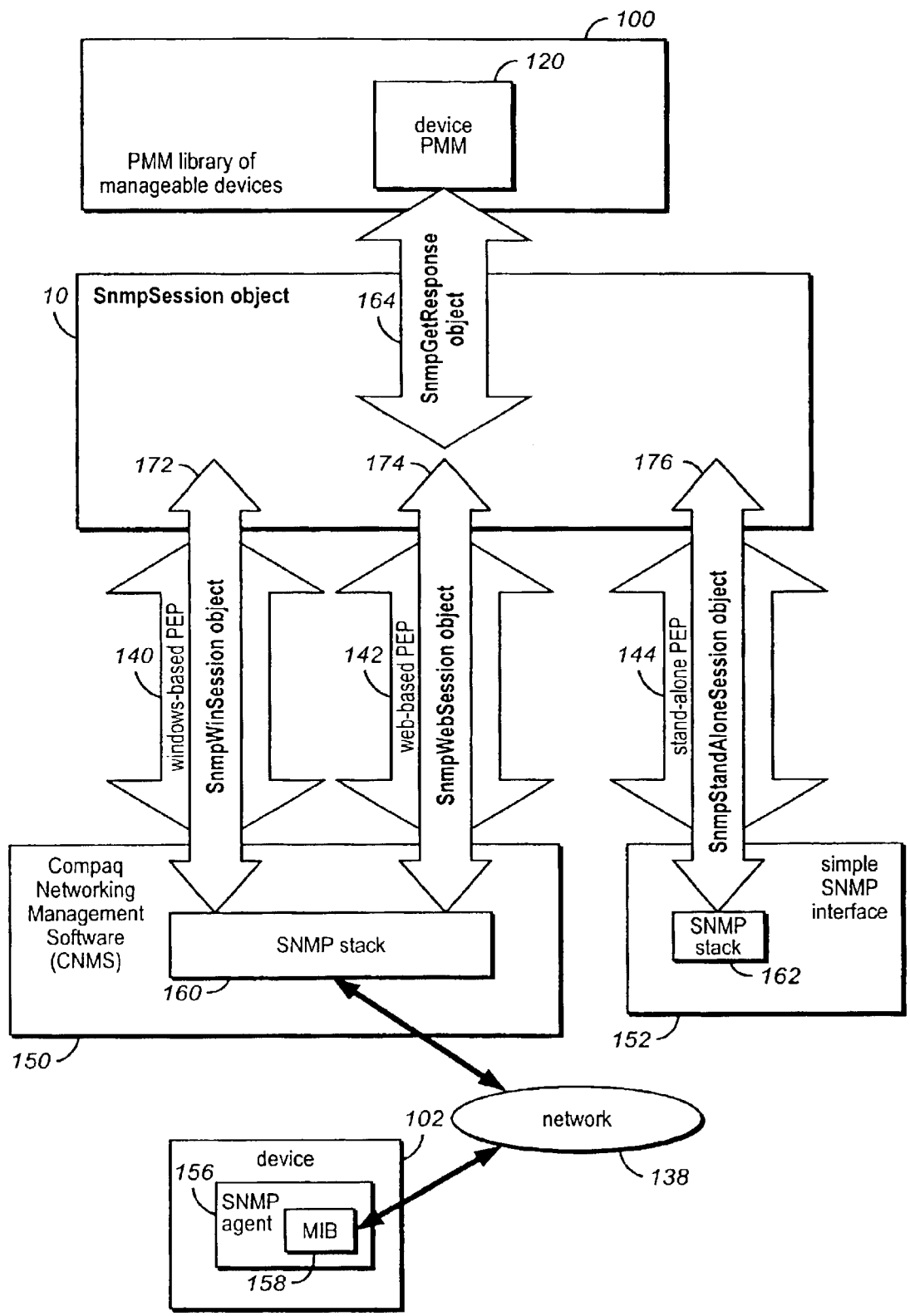
FIG. 6 is a block diagram illustrating some of the elements of the intelligent SNMP session object which interface between the device PMM and the supported operating environments.

FIG. 6 is a block diagram illustrating generally how the intelligent SNMP session object 10 operates. In the illustrated embodiment, the SNMP session object 10 is written in the Java programming language. Because Java is an object-oriented programming language, much of the functionality of Java is performed by objects. As an interface between the device PMM 120 (which ultimately performs the SNMP request) and the environment inside which the SNMP request is made, the SNMP session object 10 creates new objects as needed to perform its task.

When a SNMP request is made, the SnmpSession object 10 is created, or, in Java terms, is instantiated. The SnmpSession object 10 then determines which operating environment is running. In one embodiment, a PmmInstanceInfo object provides information about which PEP the PMM is currently running in and other information specific to that PEP. For example, if the PMM is running in a web-based PEP, a proxy IP address is maintained in a variable of the PmmInstanceInfo object, in the disclosed embodiment. In other PEPs, that proxy IP address is set to null.

FIG. 6 shows the Windows-based PEP 140, the web-based PEP 142, and the stand-alone PEP 144, as possible operating environments inside which the SNMP request originated. The SnmpSession object 10 then instantiates another object, based upon the discerned environment. In FIG. 6, one of three possible environment-specific objects is instantiated: an SnmpWinSession object 172, an SnmpWebSession object 174, or an SnmpStandAloneSession object 176.

The shading in FIG. 6 shows that the SnmpWebSession object 174 was selected for this example because the web-based PEP 142, also shown as shaded, is the current environment. The SnmpWebSession object 174 provides a path to the SNMP stack 162 of the CNMS 150 with which the device PMM 120 can perform the SNMP request. In the disclosed embodiment, only one of the environment-specific SNMP session objects 172, 174, or 176 is instantiated at any time, although this is not critical. Each SNMP session object 172, 174, or 176 serves as a gateway to its corresponding SNMP provider.

Once the device PMM 120 completes the SNMP transaction, the SNMP stack of the network management software contains the result. Because the stack information is retrieved differently depending on the operating environment, the SnmpSession object 10 instantiates an SnmpGetResponse object 164 to convert the response information into a single format that can be sent back to the device PMM 120.

Figure 7:
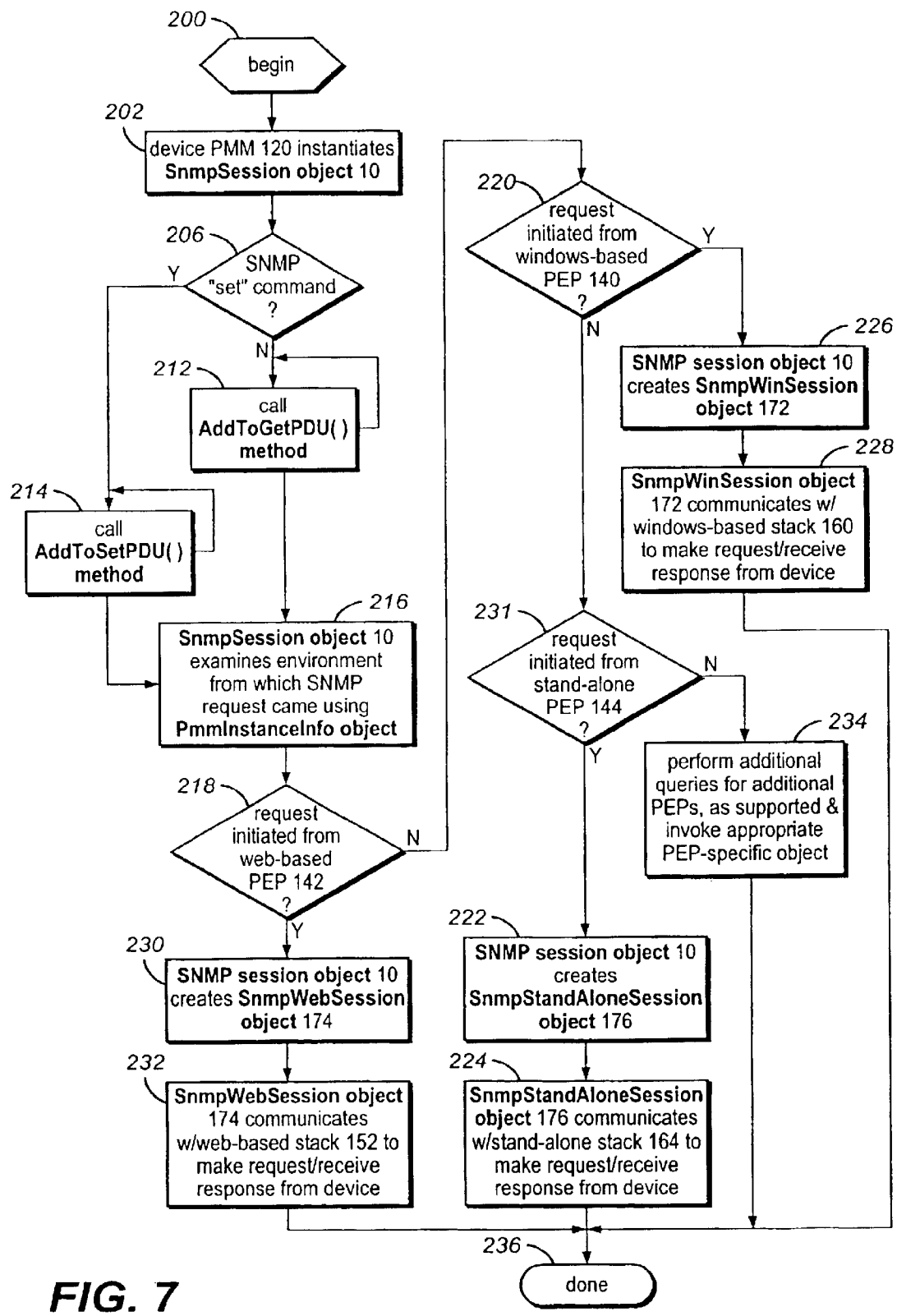
FIG. 7 is a flow diagram showing the steps taken according to one embodiment to permit a device PMM to execute SNMP commands in a variety of operating environments.

FIG. 7 is a flow diagram demonstrating the steps taken by the intelligent SNMP session object 10 to assist with SNMP requests, according to one embodiment. The process begins at step 200. First, the device PMM 120 that is to perform an SNMP request instantiates the SnmpSession object 10, at step 202.

Next, the device PMM 120 populates a protocol data unit, or PDU, with a list of MIB objects to be returned. Thus, step 206 is shown, performing a query as to whether an SNMP "set" command is to be performed. For SNMP "set," the device PMM 120 calls an AddToSetPDU( ) method, shown in step 214. If a SNMP set command is not to be performed, then, a SNMP "get" or "get next" command is to be performed. For SNMP "get" or "get next" commands, the device PMM 120 calls an AddToGetPDU( ) method, shown in step 212. As shown in FIG. 7, both the AddToGetPDU( ) and AddToSetPDU( ) methods may be called repeatedly, as needed. In the disclosed embodiment, there are various methods corresponding to the typical SNMP commands.

At this point, the PMM prompts the SNMP session object 10 to send the SNMP request to the SNMP stack. In order to access the SNMP stack, at step 216, the SnmpSession object 10 first examines the current operating environment. In the disclosed embodiment, a PmmInstanceInfo object returns the current operating environment, and is thus used by the SnmpSession object 10 to make this determination. The flow diagram of FIG. 7 shows that, depending upon the information returned by the PmmInstanceInfo object, different paths may be taken, shown at steps 218 and 220. As with FIG. 6, three PEPs are presumed in FIG. 7: the Windows-based PEP 140, the web-based PEP 142, and the stand-alone PEP 144, although more PEPs may be available to the device PMM 120.

Once the PEP has been determined, the SnmpSession object 10 then instantiates a distinct object for one of three possible PEPs. If the web-based PEP 142 initiated the request, as determined by the query in step 218, the SnmpWebSession object 174 is instantiated, shown at step 230. Then, at step 232, the SnmpWebSession object 174 communicates with the web-based stack 162 to make requests and receive responses from the device.

If, instead, the Windows-based PEP 140 initiated the request, as determined by the query in step 220. the SnmpWinSession object 172 is instantiated, shown at step 226. Then, the SnmpWinSession object 172 communicates with the Windows-based stack 160 to make requests and receive responses from the device, shown at step 228.

Third, if the stand-alone PEP 144 initiated the request, as determined by the query in step 231, the SnmpStandAloneSession object 176 is instantiated, shown at step 222. Then, at step 224, the SnmpStandAloneSession object 176 communicates with the stand-alone stack 164 to make requests and receive responses from the device.

If the request is not initiated from the stand-alone PEP 144, control instead proceeds from step 231 to step 234, where additional queries may be made to determine the PEP from which a request was initiated. Accordingly, the appropriate PEP-specific object may be invoked. From any of steps 224, 228, 232, or 234, the operation is complete at step 236. Thus, by using environment-specific SNMP session objects 172, 174, or 176 as a gateway between the device PMM 120 and the appropriate stack 160, 162, or 164, an SNMP command is successfully processed.

Figure 8:
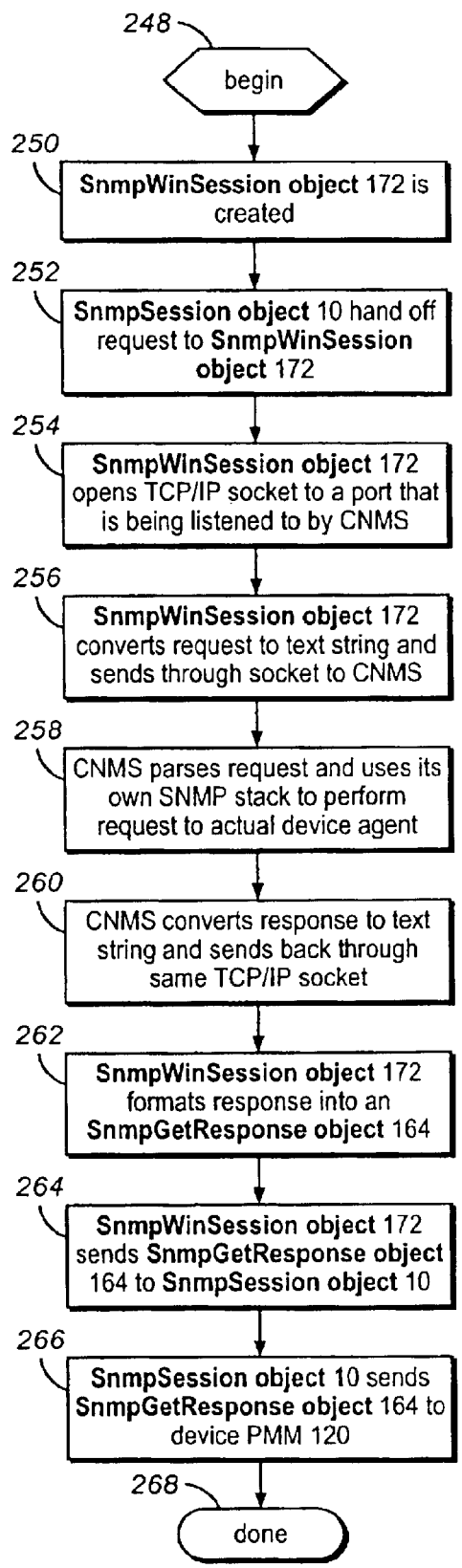
FIG. 8 is a flow diagram showing the steps taken according to one embodiment to execute an SNMP command in a Windows-based operating environment.

FIG. 8 is a flow diagram illustrating how the device PMM 120 of FIG. 6 communicates with the Windows-based PEP 140 once the SnmpWinSession object 172 is opened. The flow diagram begins at step 248. At step 250, a SnmpWinSession object 172 is created, as discussed in FIG. 7. The SnmpSession object 10 then hands off the request to the SnmpWinSession object 172, at step 252. The SnmpWinSession object 172 then opens up a TCP/IP socket to a port that is being listened to by CNMS, shown at step 254. The request is converted into a text string and then sent through the socket to CNMS, at step 256.

CNMS next parses the request, at step 258, and uses its own SNMP stack 160 to perform the request to the actual device agent. The response is likewise converted to text and pushed through the same socket, shown at step 260. The SnmpWinSession object 172 formats the response, at step 262, into a SnmpGetResponse object, a standard object sent to the device PMM 120. First, however, the SnmpWinSession object 172 sends the standard object to the SnmpSession object 10, at step 264. Finally, the SnmpSession object 10 sends the SnmpGetResponse object 164 to the device PMM 120, at step 266.

Figure 9:
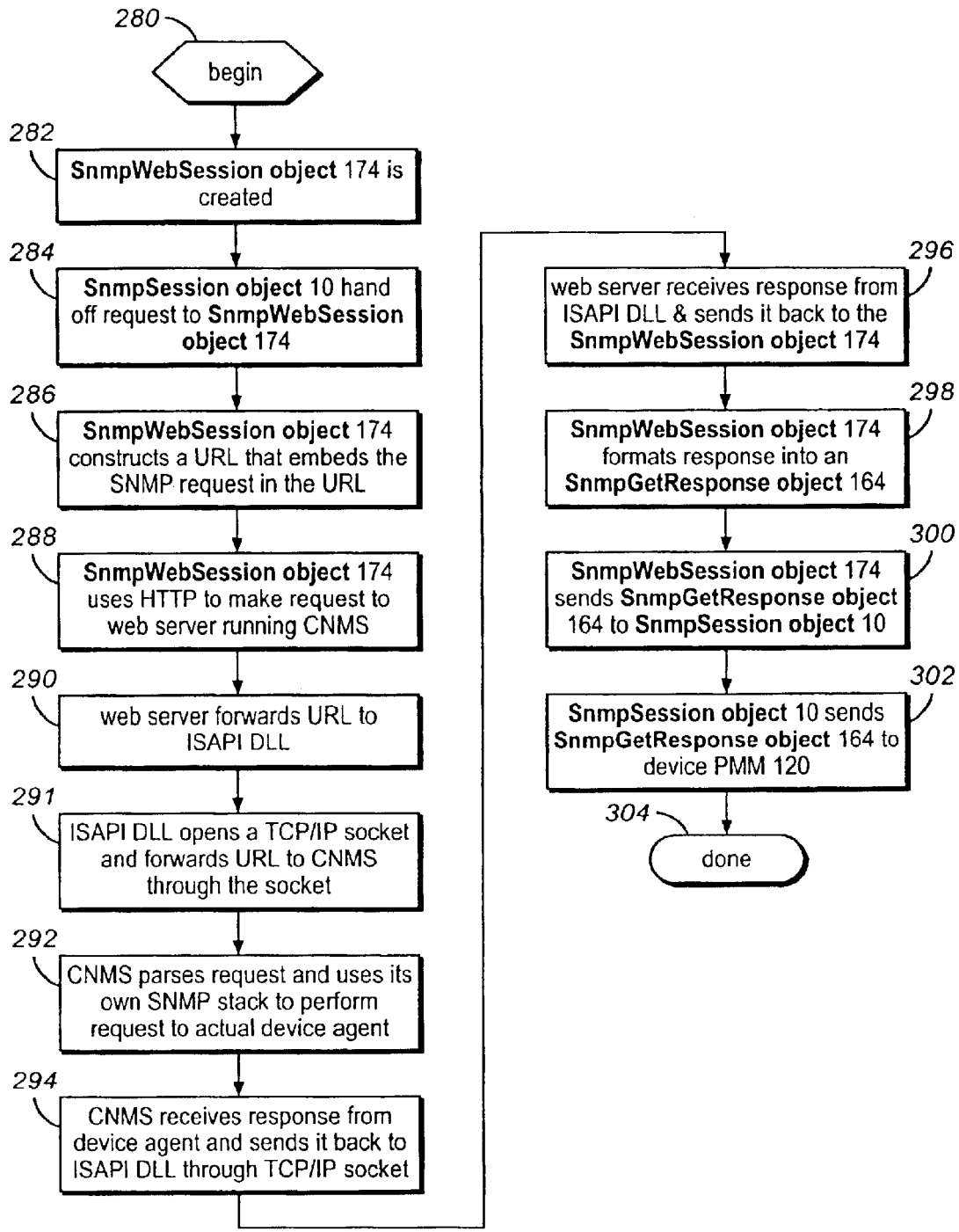
FIG. 9 is a flow diagram showing the steps taken according to one embodiment to execute an SNMP command in a web-based operating environment.

FIG. 9 is a flow diagram illustrating how the device PMM 120 of FIG. 6 communicates with the web-based PEP 142 once the SnmpWebSession object 174 is opened. In the disclosed embodiment, a program was developed according to the Internet Server Application Programmer Interface, or ISAPI, standard. ISAPI was developed by Microsoft to assist development of web-based applications. The program, a dynamic link library, or DLL, file, controls the opening and closing of a TCP/IP socket, which is used for passing a URL, as described below.

The process begins at step 280. At step 282, the SnmpWebSession object 174 that was instantiated by the SnmpSession object 10, described in FIG. 7, is created. The SnmpSession object 10 then hands off the request to the SnmpWebSession object 174, shown at step 284. The SnmpWebSession object 174 then constructs a uniform resource locator, or URL, that embeds the SNMP request, in step 286. At step 288, the SnmpWebSession object 174 uses hypertext transfer protocol, or HTTP, to make the request to the web server which is running CNMS. The web server, at step 290, hands off the URL to an ISAPI DLL. In step 291, the ISAPI DLL opens a TCP/IP socket and forwards the URL to CNMS through the socket.

As in the Windows-based environment of FIG. 8, CNMS proceeds with the web-based environment similarly. At step 292, CNMS parses the request and uses its own SNMP stack 160 to perform the SNMP request to the actual device agent. Then, at step 294, CNMS receives the response back from the device agent. The response is sent back to the ISAPI DLL through the TCP/IP socket connection, which then sends the response back through the web server to the web browser. The web server then receives the response from the ISAPI DLL and sends it back to the SnmpWebSession object 174, at step 296.

At step 298, the SnmpWebSession object 174 formats the response into an SnmpGetResponse object 164. At step 300, the SnmpWebSession object 174 sends the SnmpGetResponse object 164 to the SnmpSession object 10. Finally, the SnmpSession object 10 sends the SnmpGetResponse object 164 to the device PMM 120, completing the SNMP session. It should be understood that certain tasks specific to CNMS may not apply for other types of network management software. Further, it should be understood that certain known SNMP functions and features may be leveraged for use in a management module context.

Thus, the intelligent SNMP session object 10 allows PMM developers to initiate SNMP commands without first having to determine the current operating environment. This simplifies PMM development generally by reducing the amount of code needed to support each PMM and reducing the time necessary to debug problems. Further, the intelligent SNMP session object 10 encourages the support of new operating environments by PMMs and the network management software.

The illustrative system is not limited to simplifying the gathering of SNMP data on a network. The method described herein may further be used with other software programs that are meant to run in multiple operating environments, for example. The illustrative system provides a mechanism by which each module of a program may operate in one manner under a first operating environment, but in another manner under a second operating environment. Or, the method described herein may be useful for software that is highly modularized, by providing an intelligent interface between these modules and the main program. Non-network management software may also benefit from the embodiments of the illustrative system described herein, where the SNMP gathering is replaced with the particular gathering requirements of the software.

Intelligent Button

Looking back to FIG. 2, the intelligent PMM API 112 next shows an intelligent button object 20. The intelligent button object 20 provides a mechanism for implementing a button on a graphical user interface that appears under different operating environments. The intelligent button object 20 is generally extended to create other PMM-specific classes as needed to support additional buttons. One purpose of the intelligent button object 20 is to route the user's click to the correct handler method in a child, or extended, class, also called a subclass. The correct handler method knows how to react when clicked in the current operating environment.

Without the intelligent button object 20, a PMM developer could be faced with some unattractive choices. First, the PMM developer could write repetitive code to accomplish the proper routing of functionality. This includes code to receive the button clicks, code to determine the current operating environment, and code to decide what to do next based upon the current operating environment type. Alternatively, the PMM developer could simply rewrite all the code in a completely portable language such as Java. Even then, the developer likely still faces situations where different code has to be run based upon the operating environment type. Thus, both options can be tedious.

The intelligent button object 20, known as a PMMButton object in one embodiment, takes care of listening for and receiving its own "click" events. The PMMButton object also knows how to determine the current operating environment type. Once determined, the PMMButton object then knows what method to call to insure that the correct behavior occurs.

In the disclosed embodiment, a PmmButtonBar class is provided as a convenient way of creating rows of PmmButtons. The PmmButtonBar class is a class that the PMM developer can add PmmButton objects to. To create a new button for a button bar, the PMM developer extends the PMMButton object 20 for additional button support to the user interface and writes separate handlers for each environment. This includes properly handling buttons which are not supported in a given operating environment. For example, a "MIB browser" button may only be supported under the Windows-based PEP. For a web-based PEP, then, the PMM developer simply specifies a size (height, width) of <0,0> in the PEP-specific initialization code for the "MIB browser" button. When a web browser is running, the "MIB browser" button does not appear on the GUI.

Figure 10:
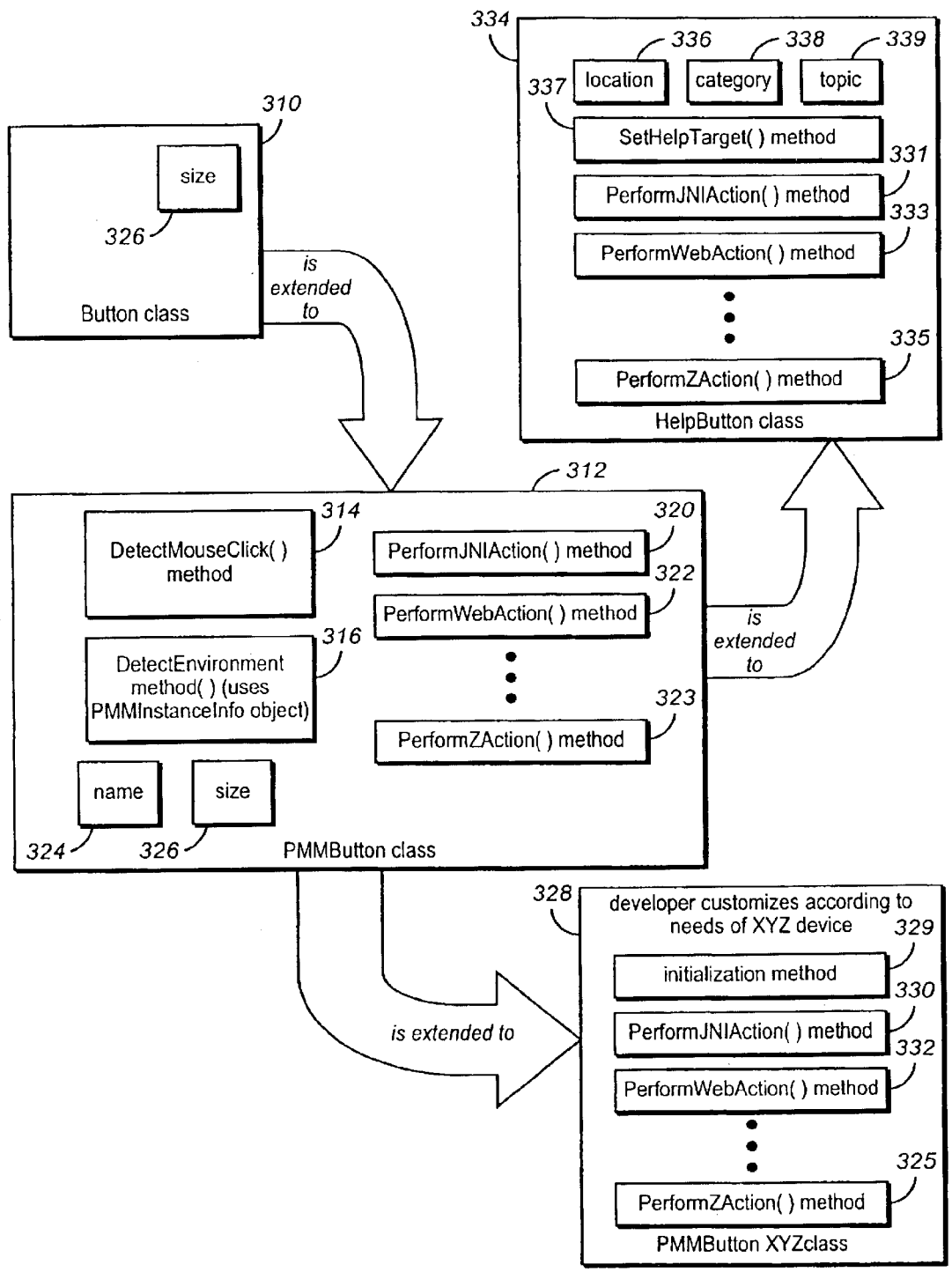
FIG. 10 is a block diagram illustrating how an intelligent button class and an intelligent help button class are extended from a Java Button class.

FIG. 10 shows a PMMButton class 312 according to one embodiment. The PMMButton class 312 is an extension of a Button class 310. The Button class 310 is a member of the library of GUI classes known as the Abstract Windows Toolkit, or AWT, that is supplied for Java programming. By extending the Button class 310, the PMMButton class 312 inherits all the features of its parent. Thus, a PMMButton class object can have capability, specific to PMMs, that Button objects lack.

In FIG. 10, the PMMButton class 312 includes several methods. First, a DetectMouseClick( ) method 314 takes care of listening for and receiving a "click" event from the user interface. The PMMButton class 312 also can determine the environment, or PEP, in which a button click occurred, shown as a DetectEnvironment( ) method 316. In one embodiment, the DetectEnvironment( ) method 316 uses a PmmInstanceInfo object to determine the operating environment, just as done by the SNMP session object 10. Once the environment is known, the PMMButton class 312 provides one of two methods, corresponding to the determined operating environments: a PerformJNIAction( ) method 320 for a Windows-based environment or a PerformWebAction( ) method 322 for a web-based environment. When a button is clicked in an environment, the corresponding method is called. It should be understood that the PmmButton class 312 can provide additional methods to support additional operating environments. Thus, FIG. 10 shows a PerformZAction( ) method 323 to support environment "Z." Finally, the PMMButton class 312 includes two attributes, name or label 324 and size 326 (e.g., the height and width of the button). The size 326 attribute was inherited from the Button class 170.

By using the extends directive, the PMM developer can readily create a subclass to provide a proper interface to the user of the device supported by the PMM. FIG. 10 shows a subclass, PMMButtonXYZ class 328, which is used to support device XYZ. The subclass, PMMButtonXYZ 328, inherited all the methods and attributes of its parent, PMMButton 312. Thus, the developer can customize the PMMButtonXYZ class 328 according to the needs of the XYZ device. First, using the attributes inherited from the parent class 312, the developer specifies a name and a size for the button that the user sees. In one embodiment, this is done in an initialization method 329. Then, customized routines, (one routine per PEP) such as PerformJNIAction( ) method 330, PerformWebAction( ) method 332, and PerfornZAction( ) method 325 are written to suit the needs of the XYZ device.

Those who are familiar with Java programming understand that if a method is written in both a parent and child class, the parent method is overridden by the method of the child class. Thus, the PerformJNIAction( ) method 330 of the PMMButtonXYZ class 328 supplants the PerformJNIAction( ) method 320 of the PMMButton class 312. Additionally, the new PMMButtonXYZ class 328 can add new capability not found in its parent class.

Figure 11:
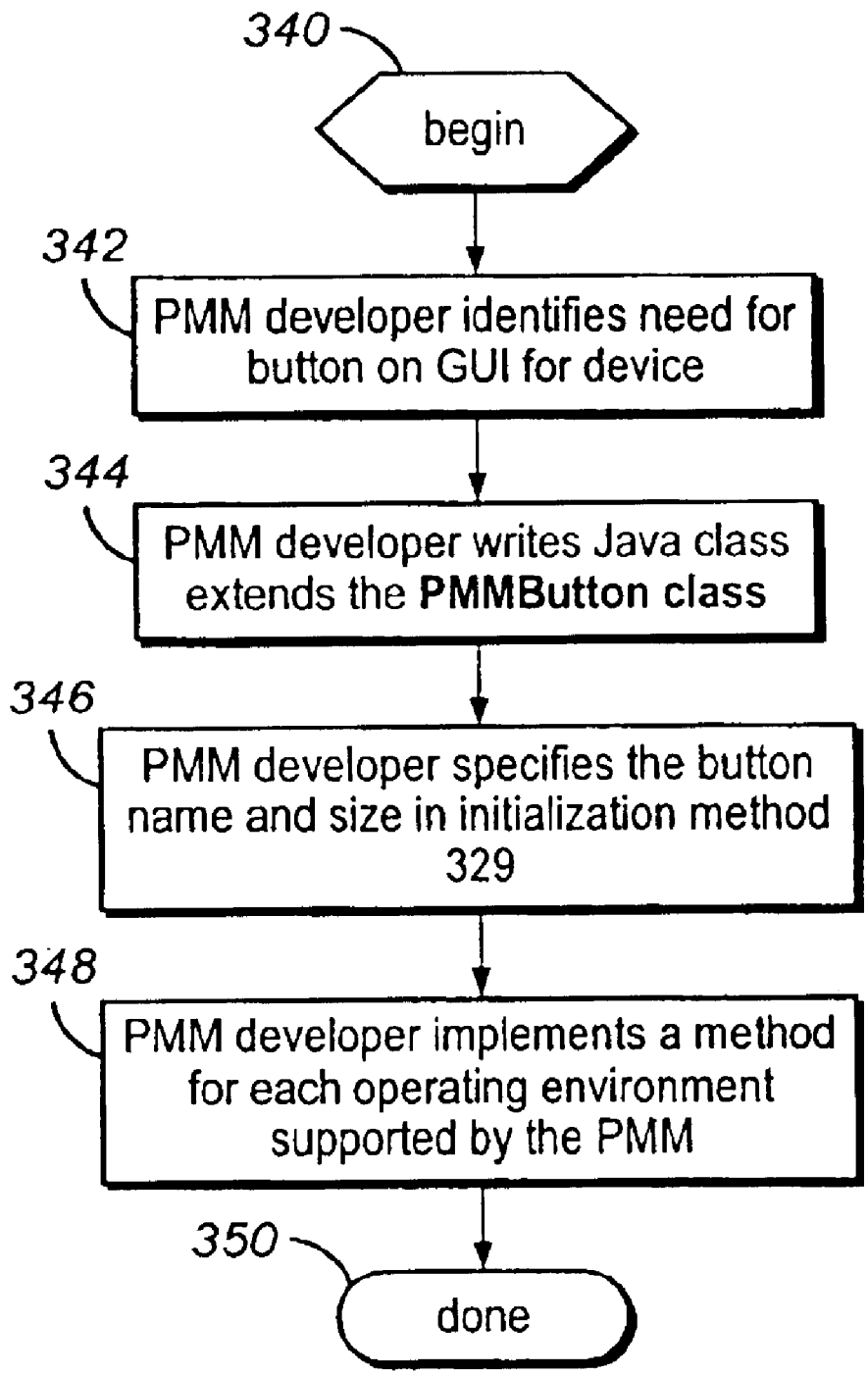
FIG. 11 is a flow diagram showing the steps taken by a PMM developer according to one embodiment to support a button on a graphical user interface under different operating environments.

FIG. 11 is a flowchart demonstrating how a PMM developer uses the PMMButton class 312 of FIG. 10 to provide a button interface for the PMM that operates distinctly in different environments. The process begins at step 340. At step 342, the PMM developer identifies a need for a button for the device which is supported by the PMM. At this point, the PMM developer writes a Java class that extends the PMM button class, at step 344. (The effects of extending a class in Java is illustrated in FIG. 10, above, as PMMButtonXYZ 328.) Then, at step 346, the PMM developer specifies the button name and size in initialization method 329 of FIG. 10. The button name will be text that the user sees on the button. The size specifies how big the button looks on the user interface. The name and size of a button can differ depending on the operating environment.

Next, at step 348, the PMM developer implements a method for each possible operating environment. A separate method for each possible operating environment is useful since different actions may be necessary in different environments to accomplish the same result. Finally, at step 350, the process of using the PMMButton class 312 by the PMM developer is complete.

Alternatively, the PerformJNIAction( ) method 330, as shown in FIG. 10, may be invoked in the Windows environment. A CnmsFunctionGateway object is created and passed as a parameter into the PerformJNIAction( ) method 330. The CnmsFunctionGateway object opens a Java Native Interface, or JNI, connection back to CNMS. This connection is utilized because CNMS is written in C++ programming language while the PMMs are written using in Java. The method can then include code to perform whatever action is required, including any JNI calls back to CNMS.

Figure 12A:
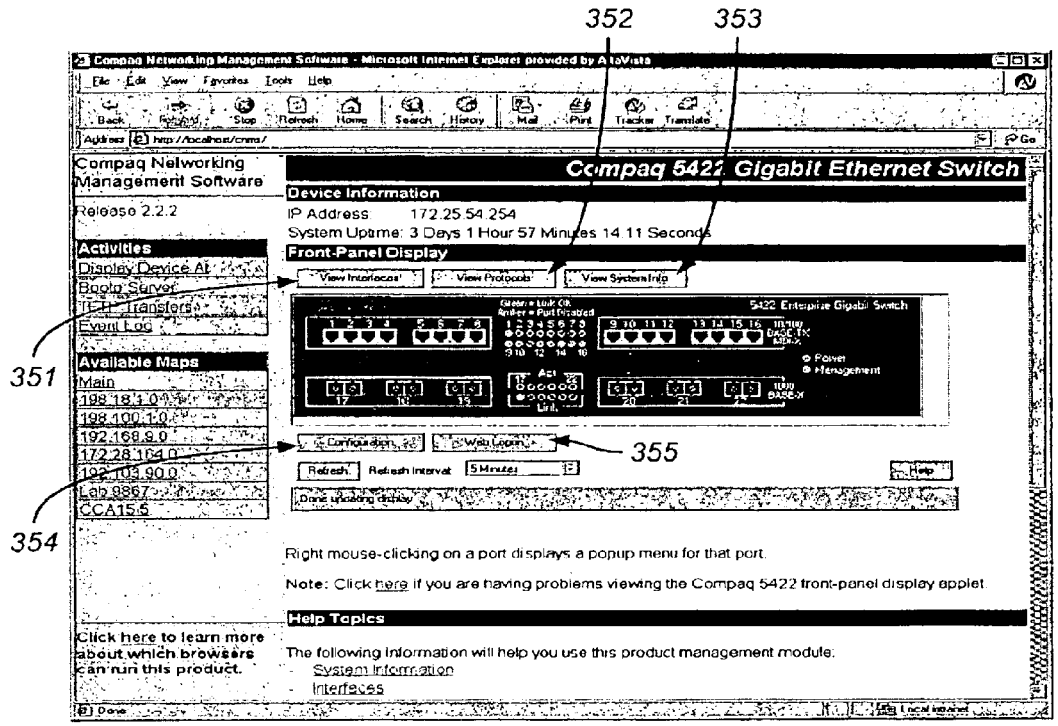
FIG. 12a is a screen shot of CNMS illustrating how the intelligent button object supports a number of buttons in a web browser operating environment.
Figure 12B:
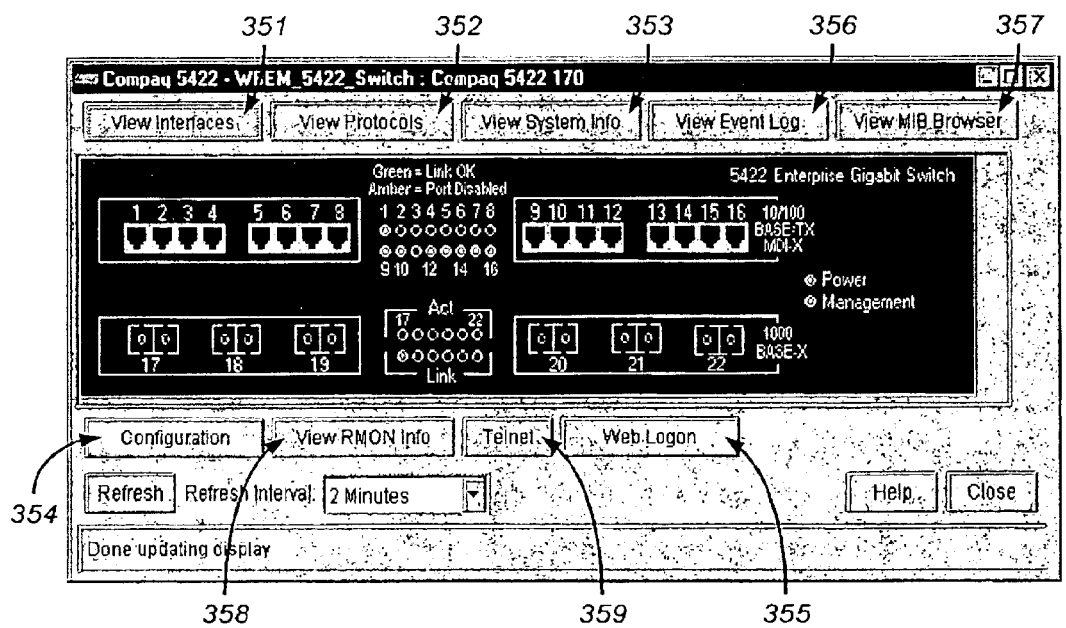

FIGS. 12a and 12b are two screen shots of CNMS which employ the intelligent button object 20 of the intelligent PMM API 112. FIG. 12a is a screen shot of how CNMS may appear on a web browser. The device being displayed is a Compaq 5422 Gigabit Ethernet Switch, as shown in the title screen. A "View Interfaces" button 351 is shown, as well as a "View Protocols" button 352, a "View System Info" button 353, a "Configuration" button 354, and a "Web Logon" button 355, among others.

FIG. 12b is a screen shot of how CNMS may appear under the Windows operating environment. Again, the device being displayed is a Compaq 5422 Gigabit Ethernet Switch. In addition to the five buttons 351, 352, 353, 354, and 355, seen in FIG. 12a, the display additionally shows a "View Event Log" button 356, a "View MIB Browser" button 357, a "View RMON Info" button 358, and a "Telnet" button 359. The buttons 356, 357, 358, and 359 were not visible on the web browser version of CNMS, shown in FIG. 12a.

By using the intelligent button object 20 of the intelligent PMM API 112, the PMM developer for the 5422 Gigabit Ethernet Switch, specifies that the "View MIB browser" button 357, for example, only appear under the Windows operating environment. Likewise, buttons 356, 358, and 359 only appear under Windows. In contrast, the "View System Info" button 353 is initialized by the PMM developer to be supported in both web- and Windows-based operating environments, as are the buttons 351, 352, 354, and 355.

Although described in terms of its use for network management software, the intelligent button object 20 is not limited to use in a network management environment. Other non-network management software may use the intelligent button object 20 to facilitate the creation and support of buttons on a graphical user interface. Further, the illustrative system can be employed to selectively provide other graphical images besides buttons on a graphical user interface, depending on the operating environment, if desired, or depending upon some other criteria.

Intelligent Help Button

Another feature of the intelligent PMM API 112 of FIG. 2 is an intelligent help button object 30. The intelligent help button object 30 provides a mechanism for implementing a help system in an application, such as providing information about a networked device, that can run under several different operating environments. Using the intelligent help button object 30, a user may run the PMM through a web browser, directly under Windows, or in another operating environment.

When the user clicks on the "Help" button in any particular dialog on the user interface, the Help button automatically locates a help file from the correct location. In the case of a web environment, the help provider is an .HTML file, for example. In the case of a Windows environment, the help provider is a Windows .HLP file. Thus, rather than having to write duplicate code in each PMM to handle accessing the correct help system and the correct information in the help system, the intelligent help button object 30 performs these tasks for the PMM developer.

Looking back to FIG. 10, the illustration shows that, like the PMMButtonXYZ class 328, a HelpButton class 334 is extended from the PMMButton class 312. Thus, the HelpButton class 334 inherits all the features of PMMButton class 312, plus can include additional features. The help button object 30 may be instantiated from the HelpButton class 334, to provide the facility to support help buttons by the PMMs in multiple operating environments.

The HelpButton class 334 includes three attributes: a location 336, a category 338, and a topic 339. The location attribute 336 specifies where on the GUI the help button is located. The category attribute 338 specifies what category of help is to be provided. The category may include information about the device supported by the PMM, for example. If the device is a gigabit switch, a help screen might appear describing the switch. The topic attribute 339 specifies a subject within the category to be provided. For example, "How to Disable the Port" may be a proper topic for the device.

The HelpButton class 334 also includes three methods: a SetHelpTarget( ) method 337 establishes the category 338 and topic 339 attributes; a PerformJNIAction( ) method 331 and a PerformWebAction( ) method 333 are also present, as with the parent class, PMMButton 312, and PMMButtonXYZ class 328. As with the PmmButton class 312 and the PmmButtonXYZ class 328, the HelpButton class 334 may also support additional PEPs, as needed. Thus, FIG. 10 also shows a PerformZAction( ) method 335 to further extend help button support to a "Z" environment.

Figure 13:
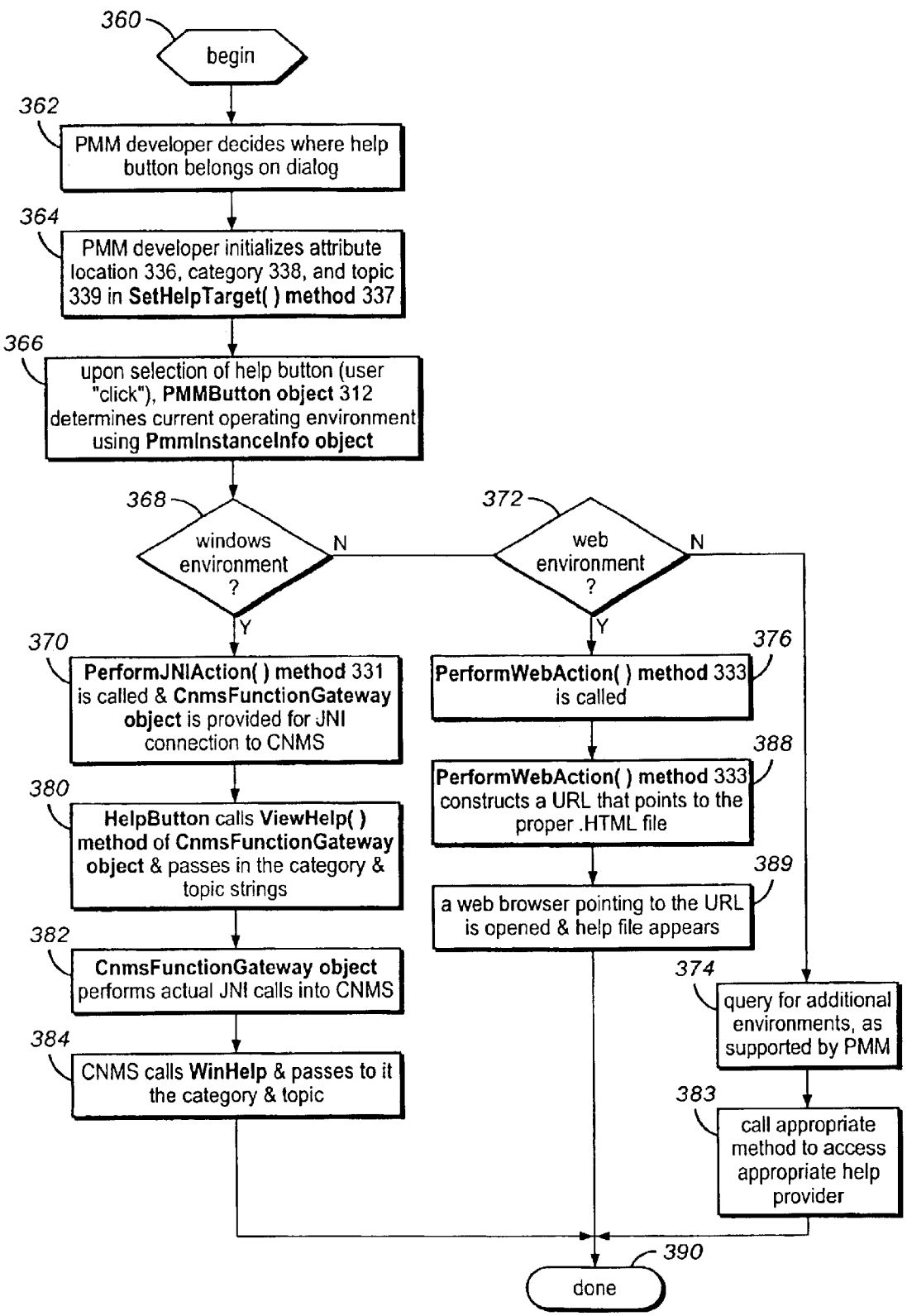
FIG. 13 is a flow diagram showing the steps taken according to one embodiment to support a help button on a graphical user interface under different operating environments.

FIG. 13 illustrates how the PMM developer may use the HelpButton class 334 to route a help request to the proper provider based upon the operating environment. The flow diagram begins at step 360. At step 362, the PMM developer decides where to place the help button on the user interface. An attribute, location 336, is provided by the HelpButton class 334 for this purpose. The PMM developer also decides what categories 338 and topics 339 to use for the device. Next, at step 364, the PMM developer calls SetHelpTarget( ) method 337 to specify the location of the help button, the category of help to be provided, and the topic within the category of help.

At step 366, when the help button on the dialog is clicked, PMMButton 312 calls the appropriate method for the environment. Thus, step 368 shows a query of the environment. If the current operating environment is Windows-based, the flow diagram proceeds to step 370. Alternatively as shown in step 372, if a web environment is involved, the flow diagram proceeds to step 376. If neither of these environments is shown, queries for additional environments, shown as step 374, can be made. From step 374, an appropriate method is called to access an appropriate help provider, in step 383.

Under Windows, the flow diagram proceeds to step 370. The PerfornJNIAction( ) method 331 is called and a CnmsFunctionGateway object is provided for a JNI connection to CNMS, as explained above. Then, from the CnmsFunctionGateway class, a ViewHelp( ) method is called, which passes in the category 338 and topic 339 strings to CNMS. The ViewHelp( ) method tells CNMS to launch WinHelp, a Windows API for providing help information. The category 338 has .HLP appended to the end of the string. This is shown as step 380. Next, at step 382, the CnmsFunctionGateway performs the actual JNI call into CNMS, at step 382. When CNMS receives the JNI request, it calls into WinHelp. CNMS then passes in the name of the .HLP file as the category 338 and a particular topic as the topic 339 to display within that help file, shown as step 384. At step 386, the operation under the Windows environment is complete.

Alternatively, the help button could appear on a dialog that is running in a web browser environment. In this case, controls proceeds from step 372 to step 376 where the PerformWebAction( ) method 333 is called. In this case, the method is called without parameters. Next, at step 388, the PerformWebAction( ) method 333 constructs a URL pointing to a .HTML file. This URL is formed by combining the following pieces of information: the address of the web server that CNMS is running on, the path to the help text, and a concatenation of the category string and the topic string. All space characters in the topic string are replaced with underscore characters. .HTML is concatenated to the end of the URL. Once the URL is constructed, it is launched into a separate web browser window and the help file appears, at step 389. At step 390, the HelpButton operation under either environment is complete.

Although two operating environments using the intelligent button object 30 are disclosed, additional environments can readily be supported, as reflected by steps 374 and 383. One benefit of the intelligent button object 30 is that future PEPs, or operating environments, can be implemented with ease and the help button works in the new PEP without requiring PMM development updates.

The intelligent help button object 30 may be used by non-network management software of a variety of types. Further, the intelligent help button object 30 may be used for display of other types of information, not limited to providing help screens to the user. Although useful for software which supports multiple operating environments, the intelligent help button object 30 nevertheless may be used by single operating environment software as well.

Intelligent Image Loader

Another feature of the intelligent PMM API 112 of FIG. 2 is an intelligent image loader 40. The intelligent image loader 40 allows a developer to simply specify an image name to be loaded. A PMM developer may need an image to be loaded that represents, for example, the device which is supported by the PMM. As with the other utility objects provided by the intelligent API 112, the presence of multiple possible operating environments for the PMM complicates an otherwise simple matter of image loading.

Figure 14:
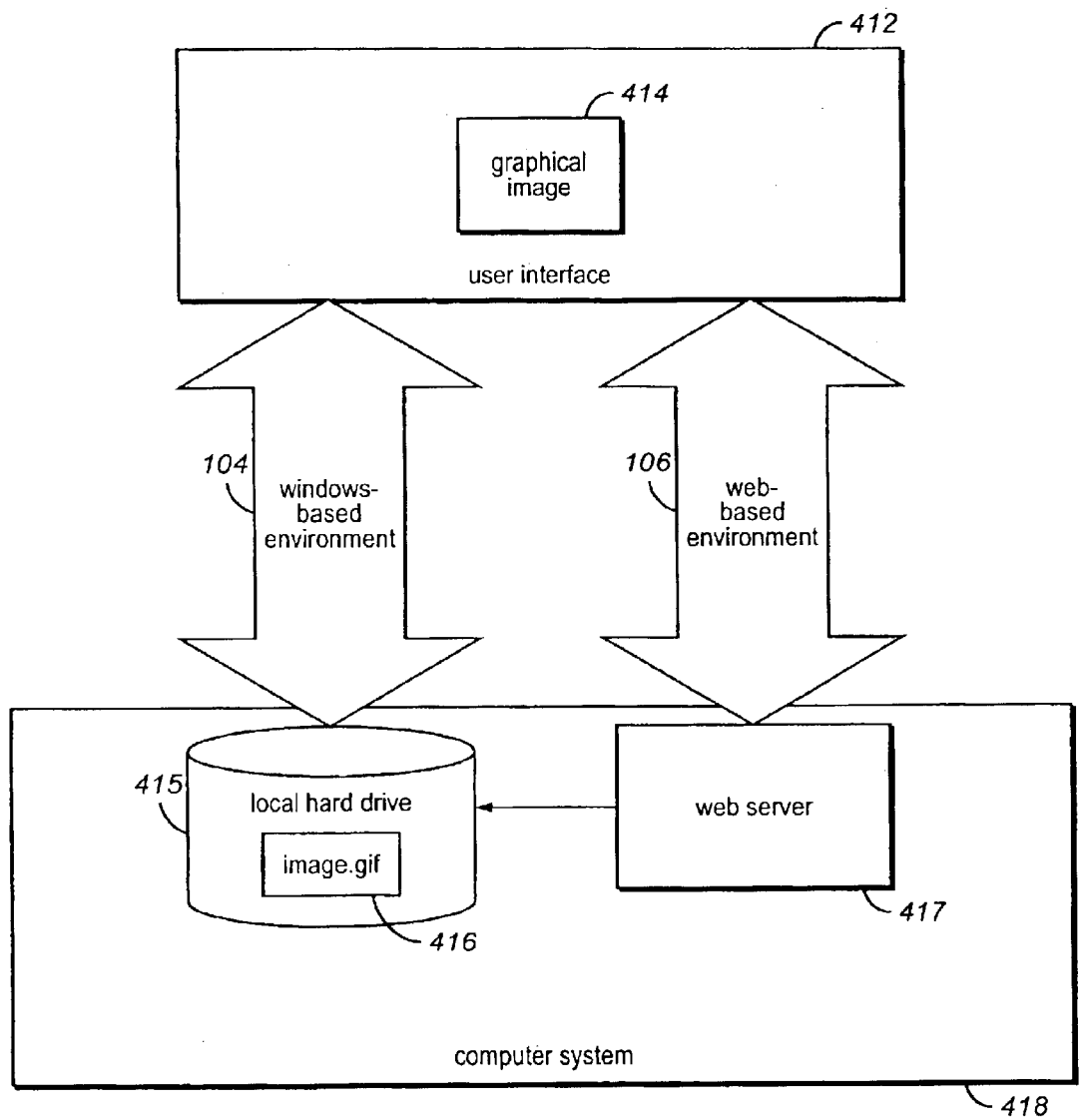
FIG. 14 is a block diagram depicting the different sources of a file for an image under two different operating environments.

FIG. 14 illustrates a situation involving two operating environments. If the operating environment is Windows-based, the image to be loaded is typically accessible from a local file system. Thus, FIG. 14 shows the Windows-based environment 104 coupled to a local hard drive 415, on a computer system 418. From the local hard drive 415, a file, image.gif 416, which contains the image, is loaded. Alternatively, if the operating environment is a web browser, the image is likely loaded over a network. Thus, the web-based environment 106 is shown coupled to a web server 417 on the computer system 418. The web server 417 accesses the same file, image.gif 416 by accessing the local hard drive 415. In the disclosed embodiment, a single image.gif is used for both operating environments. However, it is possible to maintain multiple copies of the file in multiple locations, if desired. In any case, eliminating the requirement that the PMM developer determine the operating environment before loading an image is desirable.

Figure 15:
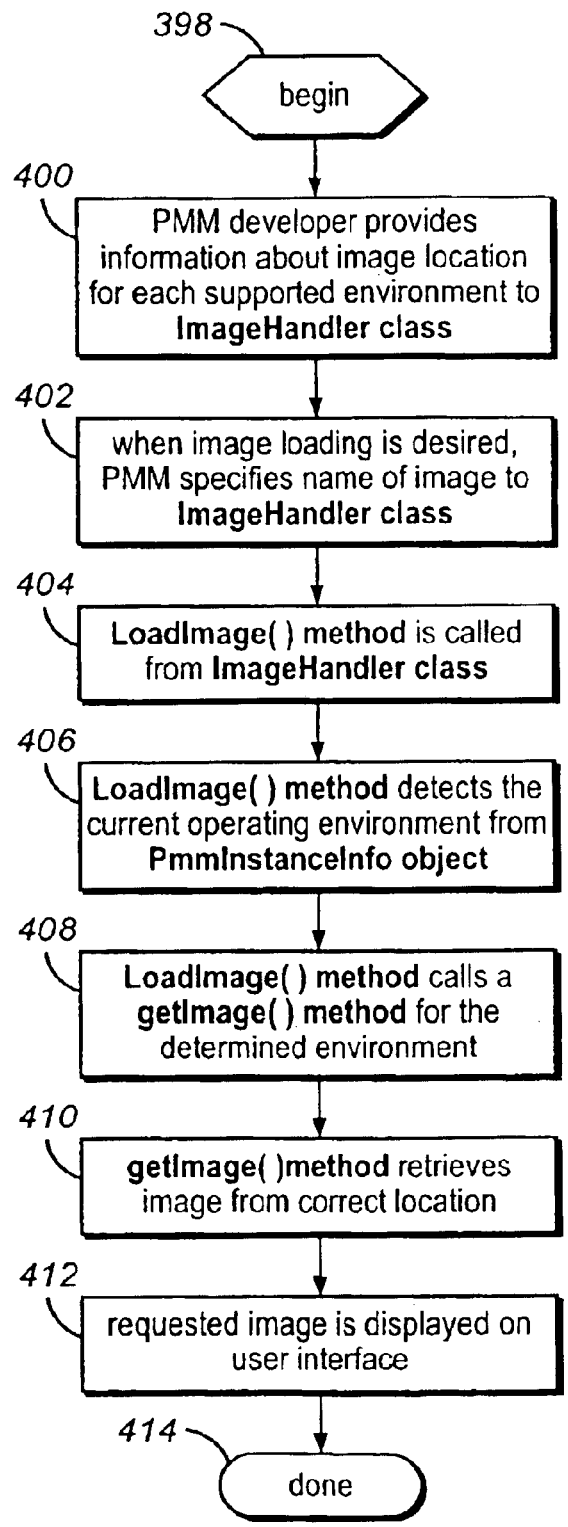
FIG. 15 is a flow diagram showing the steps taken according to one embodiment to retrieve a graphical image under different operating environments.

FIG. 15 is a flowchart illustrating steps typically taken by a PMM developer in one embodiment to use the intelligent image loader 40 of the intelligent PMM API 112 of FIG. 2. The intelligent image loader 40 includes an ImageHandler class, which further includes a LoadImage( ) method. The LoadImage( ) method intelligently loads the image from the file, network, or other location by calling a getImage( ) method. A distinct getImage( ) method may be provided for each operating environment. The appropriate getImage( ) method then returns the image to be displayed for the PMM.

The flow diagram of FIG. 15 begins at step 398. First, at step 400, the PMM developer provides location information for the getImage( ) method to ultimately perform its task. In the disclosed embodiment, the location of the image is in the PmmInstanceInfo class and is accessed using two methods: a GetBasePath( ) method and a GetPmmPath( ) method. The getImage( ) method calls these methods to retrieve the location of the image.

Next, at step 402, when the image loading is desired, the PMM specifies the image name to the ImageHandler class. At step 404, a LoadImage( ) method is called from the ImageHandler class. At step 406, the LoadImage( ) method detects the operating environment from the PmmInstance-Info object, as is also used by other objects of the intelligent PMM API 112.

At step 408, the LoadImage( ) method next calls a getImage( ) method, based upon the environment determined in step 406. Then, at step 410, the appropriate getImage( ) method retrieves the actual image for the PMM from the correct location. At step 412, the image is displayed on the graphical user interface for the user to see. The process is complete at step 414.

Thus, regardless of the particular operating environment, a PMM developer need only specify an image name and the ImageHandler class determines how to load the particular image. In the past, when loading an image, it was necessary to specify both the image name and the location information, such as the specific path, of the image. The mere passing of location information thus required the PMM developer to know the operating environment. The intelligent image loader 40 eliminates this concern for the PMM developer.

The intelligent image loader 40 may be employed by a variety of software, not limited to network management programs. Any programs which are organized into distinct modules, such as the PMMs in CNMS, described above, may be good candidates for use of the intelligent image loader 40. Further, software which is designed to work in multiple operating environments may benefit from the intelligent image loader 40.

Dynamic Graphic Image Layering Object

Referring again to FIG. 2, another feature of the intelligent PMM API 112 is a dynamic graphic image layering object 50. Because a product management module or PMM supports a particular network management device, the network management software ideally displays a graphical image of the physical device that is being managed. It is the responsibility of the PMM code to provide this graphical representation.

Often the graphical image is multi-layered. A layer of the graphical image may include a hot spot area. A hot spot area is a portion of the graphical image that is marked so that, when a cursor runs across the marked area, a change takes place. The change may be as simple as a color change appearing in the hot spot area, to indicate that the user can click on the area to invoke some occurrence. Another layer of the graphical image may be derived from SNMP-gathered values.

It is difficult to plan and write code that allows for such a layered display. For example, if objects are added out of order or a new object is to be inserted in the final graphical display, sections are often missing from the layered display because one portion of the image may overwrite another portion. Thus, it is historically tedious and time-consuming to correctly write a program to model a device. Another very infeasible approach is to have a library of predesigned images for every possible scenario that could possibly or reasonably be displayed to the end user.

The dynamic graphic image layering object 50 of the intelligent PMM API 112 addresses these concerns by requiring less planning for the PMM developer. Further, the object 50 permits simple modifications to be made to code when requirements change or enhancements are desired. The framework also permits much quicker prototyping of concepts using the set of base classes that are defined. Further, the framework provides a consistent look and feel for all graphical images created by the various PMMs.

The dynamic graphic layering object 50 also enforces the ordering of the display layers so that the developer does not have to handle the tedious task of carefully planning how to draw each item on the screen. The disclosed layering technique provides a parent-child relationship for the object layering and plug-in modules found in many devices. This parent-child relationship applies also to the <X,Y,Z> coordinates to which an image is drawn. Using the disclosed layering technique, a PMM developer can thus specify where an image belongs in an <X,Y,Z> position and, regardless of where the parent object is, the image will be properly placed.

In the disclosed embodiment, a PmmUnitPanel class is used by the dynamic graphic image layering object 50 to track and manage how the graphical image looks on the GUI. The PmmUnitPanel class includes two methods used to generate the image: an addPmmActionObject( ) method and a PlaceAllSubObjects( ) method, both described below. Additionally, several objects from the PmmUnitPanel class (and one from another class) are used to generate portions of the graphical image, which are themselves known as layered objects.

In the disclosed embodiment, the layered objects are first presented upon an agent panel, which is created using a PmmAgentPanel object. This is the building block upon which all the layered objects are placed. These layered objects may be one of four types.

First, a PmmUnitPanel object creates a unit panel, to be placed upon the agent panel. This unit panel is also known as a base layer or main panel. Essentially, the PmmUnitPanel is a rectangle with scrolling capability in the disclosed embodiment. One or more unit panels may be added to the agent panel, using the PmmUnitPanel object. Additional modules and cards in the form of PmmUnitPanel objects can be placed upon any one of the unit panels in the agent panel layer as nested unit panels.

Second, using an ImageHandler object, as described above, permits a graphic image to be added as a layered object. The developer first obtains a graphic image needed for the display from the ImageHandler class, described above. The PMM developer then specifies coordinates within the base or parent graphic image for layered items to be placed thereupon.

Third, a PmmMenuHotSpot object generates a "hot spot" object as a layered item. The "hot spot" object allows the user to right click in an area of the graphical image, at which point a pop-up menu appears. A visual queue can then be displayed to indicate that something such as a port is selected. Finally, a PmmSnmpHotSpot object allows the layered objects to include an image derived from SNMP-gathered values. It should be understood that a variety of managed items may be based upon SNMP data. The PmmMenuHotSpot and PmmSnmpHotSpot objects can be added to any one of the unit panels.

Figure 16:
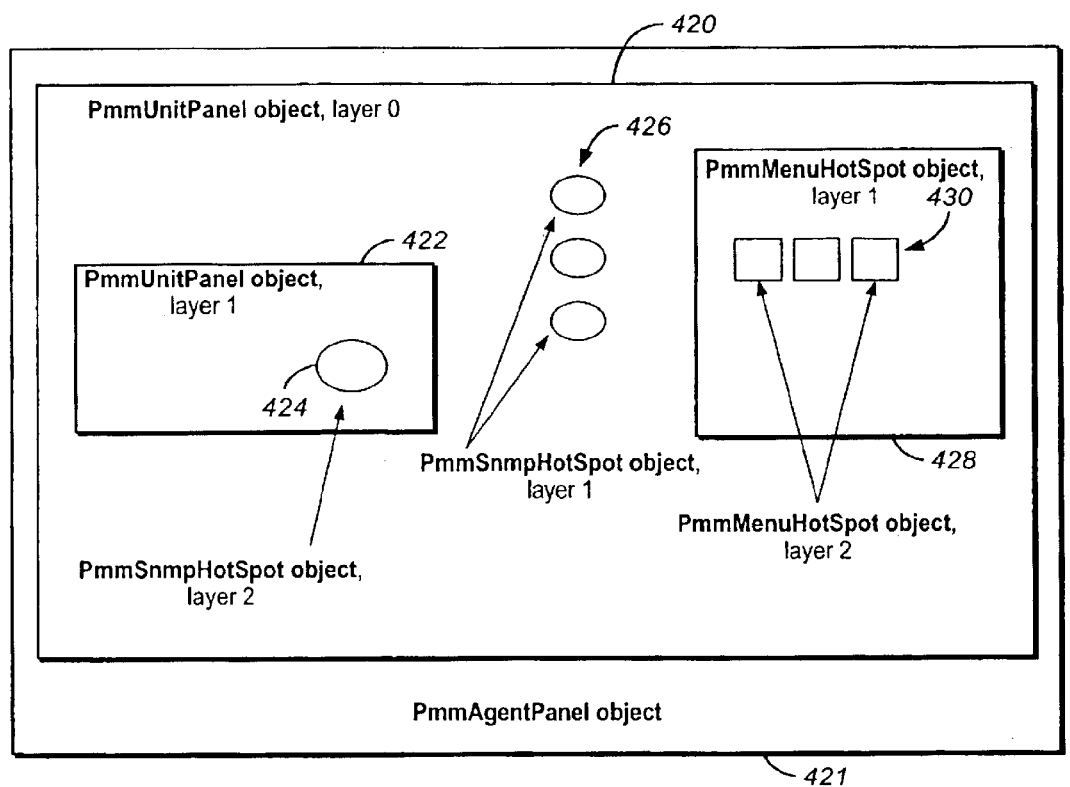
FIG. 16 is a block diagram showing how a dynamic graphic image layering object stacks different object types to create a graphic image suitable for display.

FIG. 16 illustrates how the dynamic graphic image layering object 50 works according to one embodiment. First, a PmmUnitPanel object 420 of the graphical image is shown. This object 420 "sits" upon a PmmAgentPanel object 421, and is thus designated as layer 0. Next, a second PmmUnitPanel object 422 is shown, on the PmmUnitPanel object 420. As a sub-unit panel of the PmmUnitPanel object 420, the PmmUnitPanel object 422 is designated as layer 1, and may be a module of some sort.

A PmmSnmpHotSpot object 424 is also shown in FIG. 16. This object 424 is on top of the object 422. Thus, the PmmSnmpHotSpot object 424 is designated as a layer 2 object. As stated above, the PmmSnmpHotSpot object generates a graphic based upon SNMP-gathered data. So, for example, the object 424 shown in FIG. 16 may represent an LED. The graphic image may be "red" to denote that a port is off or "green" to denote that the port is on. The PmmSnmpHotSpot object takes care of gathering the pertinent information from the actual device for properly displaying the hot spot. Next, FIG. 16 shows a second PmmSnmpHotSpot object 426, which resides on top of the PmmUnitPanel object 420. As a sub-unit of a layer 0 object, the PmmSnmpHotSpot object 426 is designated as a layer 1 object.

In one embodiment, a PmmSnmpHotSpotClause class is used in connection with image selection based on Boolean operations. More particularly, that class stores rules for determining what image will be displayed based on a return value of SNMP data. These rules are created by calling any or all of the following methods in the PmmSnmpHotSpot class: StartIf( ), addAndTerm( ), addOrTerm( ), endIf( ), thenDisplay( ), or elseIf( ). Each call to one of these methods adds a clause to a vector of clauses. After an SNMP response is received, the vector is traversed looking for matches of OID values based on the rules set up using the six methods, above. If a match is found, then the image associated with the "thenDisplay" clause can be displayed.

Then, a PmmMenuHotSpot object 428 is shown in FIG. 16. The PmmMenuHotSpot object 428 is a layer 1 object because it is a sub-unit of the PmmUnitPanel object 420, which is a layer 0 object. As explained above, this part of the graphical image is responsive to mouse movement over the image. The PmmMenuHotSpot object takes care of properly displaying this type of hot spot. The PmmMenuHotSpot object can highlight the intended area and displays a popup menu when clicked by the user. Finally, a second PmmMenuHotSpot object 430 is shown, on top of the PmmMenuHotSpot object 428. The PmmMenuHotSpot object 430 is a layer 2 object.

Figure 17:
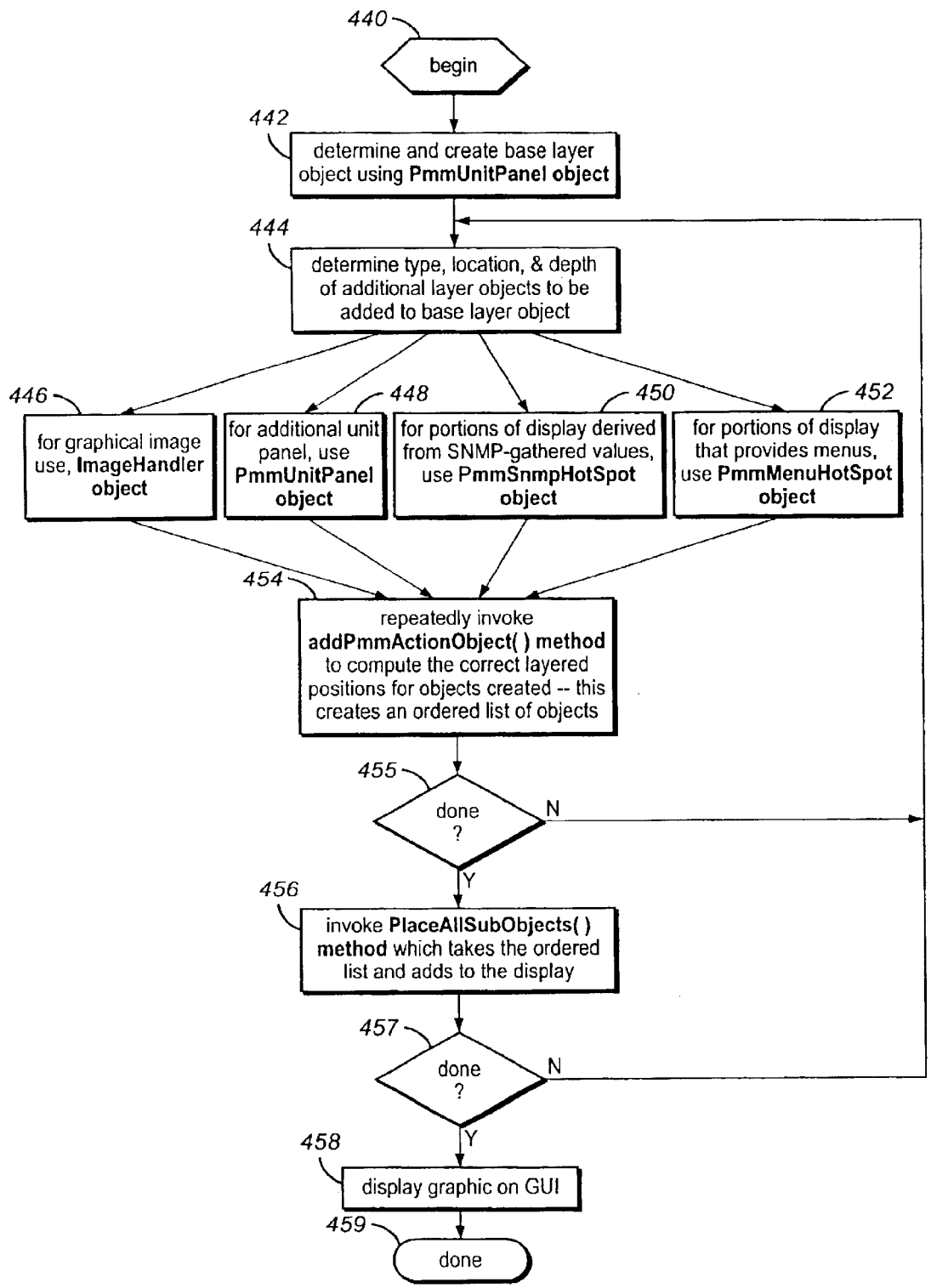
FIG. 17 is a flow diagram showing the steps taken by a PMM developer according to one embodiment to layer dynamically chosen graphical images into a user display representative of the device being supported, under different operating environments.

FIG. 17 shows the steps involved in using the dynamic graphic image layering object 50 of FIG. 2. The process begins at step 440. First, at step 442, the PMM developer determines and creates a base layer object using the PmmUnitPanel class. This object is also known as the base module unit panel. Then, at step 444, the PMM developer determines the type, the location, and the depth of additional layering objects to be added to the base layer object. The layered objects may additionally include one of four object types, as described above. Layered portions should be identified uniquely when objects need to be placed upon one another.

First, at step 446, for a graphical image, the ImageHandler object is invoked. Next, if an additional unit panel is to be added, the PmmUnitPanel object is invoked, shown at step 448. Third, portions of the display may be derived from SNMP-gathered values. For such displays, the PmmSnmpHotSpot object is invoked. Finally, some portions of the display may allow for a user-selectable area such as a port to be defined. As the user moves a mouse over the area, a displayed change is made to indicate that the area is selected. Also, a pop up menu can be associated with this area so that when the user right clicks the mouse, menu selections are made available. For these types of hot spots, the PmmMenuHotSpot object is invoked, shown as step 452.

Any or all of steps 446, 448, 450, and 452 may be invoked, depending on the graphic to be displayed. At step 454, the addPmmActionObject( ) method is then invoked repeatedly as needed to perform the display setup. This method computes the correct layered positions and place the objects on the display relative to one another. The developer obtains the <X,Y,Z> coordinate for the location of each layered object. Each layered object can be defined in any order. The repeated invocation of the addPmmAction Object( ) method ultimately creates an ordered or sorted list of objects.

In the disclosed embodiment, the developer has an option to add additional layers to the unit panel, even after the addPmmActionObject( ) method has been called. Thus, at step 455, if additional layers are desired, the developer may return to step 444 to add new layer objects. Otherwise, at step 456, the PlaceAllSubObjects( ) method is called to actually convert the ordered list to an image to be placed upon the display. In the disclosed embodiment, it is also possible to add new objects to the graphic after the PlaceAllSubObjects( ) method has been invoked. Thus, at step 457, a query is made whether the graphic is "done." If not, control proceeds back to step 444, where new layered objects may be added. Then, as soon as the PlaceAllSubObjects( ) method is again invoked in step 456, a newly updated graphical image is ready for display to the user interface. Step 458 shows that the graphic is finally displayed on the graphical user interface. The process is complete at step 459.

In a disclosed embodiment, the dynamic graphic image layering object 50 can facilitate the "refresh" feature of the graphical user interface. Utilizing the dynamic graphic image layering object 50, the PMM developer can control the order in which layers are refreshed as well as which layers are refreshed. Further, items can be added to the graphical user interface and inserted as part of the image so that they are properly displayed.

The dynamic graphic image layering object 50 described herein is not limited to use with network management programs. Although in the disclosed embodiment, part of the image may be based upon SNMP-gathered information, other software programs which provide dynamic images based upon some gathered criteria may be good candidates for this object 50. For example, software which "draws" pictures of the components of a computer system, based upon the determined configuration may employ this mechanism. Or, programs which display images based upon user input or other dynamic criteria can use the dynamic graphic image layering object 50 to simplify the work of generating these images.

SNMP Indexing Class For Dynamic Dialogs

Referring again to FIG. 2, another feature of the intelligent PMM API 112 is an SNMP dynamic dialog indexing class 70. Like the previous dynamic graphic image layering object 50, this class 70 simplifies the work associated with creating and updating graphical images on the user interface for the PMM developer.

The GUI of a network management program typically provides information about the managed devices on the network. Retrieval of MIB information from a device is achieved using SNMP commands, as described above. The manner in which the information is displayed to the end user may use multiple dialogs. For example, the user may request status information about a single port, or about all the ports in a device unit. The display of a single port of information may use one dialog while multiple ports of information are more properly displayed in a list format, using a second dialog.

For the PMM developer, the retrieval of the same set of MIB objects requires duplication of code because at least two interfaces are supported. The dynamic dialog indexing class 70 provides a mechanism for passing user requested information to an index class, which then sets the dialog attributes for the user interface. The dialog attributes selected are based upon user selection, as by a mouse click on a button or port, for example. The way the dialog appears, however, depends upon the index class that is created by the dynamic dialog indexing class 70.

Figure 18A:
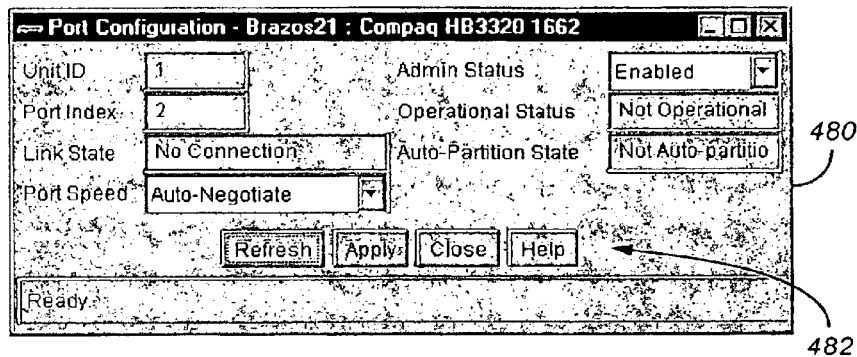
FIG. 18a is a screen shot of a dialog displaying port information according to one embodiment, used to illustrate a dynamic dialog indexing class of the illustrative system.
Figure 18B:
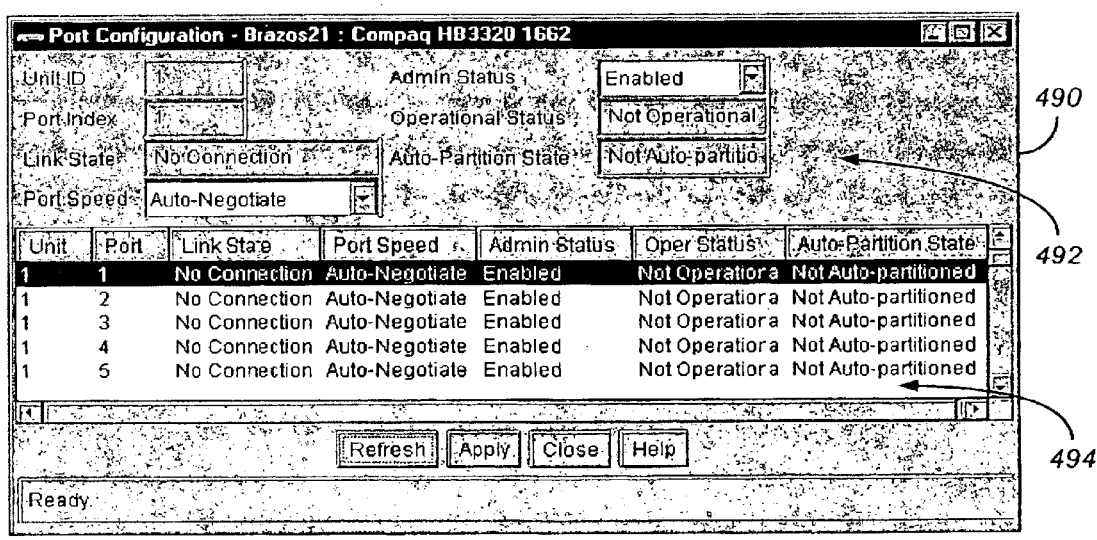
FIG. 18b is a second screen shot of an alternative dialog displaying port information according to one embodiment, used to illustrate the dynamic dialog indexing class of the illustrative system.

FIGS. 18*a* and 18*b* are screen shots of two dialogs (sharing the same code or file) that display port configuration information for a Compaq HB3320 12-port, dual-speed fast Ethernet hub. A first screen shot 480, shown in FIG. 18*a*, includes a dialog 482 that displays relevant information for port__2 of unit__1. A second screen shot 490, shown in FIG. 18*b*, includes a dialog 492 very similar to the dialog 482 of FIG. 18*a*, but additionally includes a second dialog 494, which is a list of all port information for unit__1. Each display requires retrieval of the same set of MIB objects, the information for unity__1.

The dynamic dialog indexing class 70 operates by allowing the PMM to pass received user input into an index class. A subsequent dialog is then dynamically generated, based upon the contents of the index class. A PMM developer does not have to write two or more versions of the same or similar dialog to support different lists. Further, a consistent user interface is provided, independent from the particular network-managed device. The user interface is consistent in the sense that MIB data, for example, is presented similarly, regardless of the device from which the MIB data is received.

In the disclosed embodiment, the dynamic dialog indexing class 70 is used when a MIB object selected presents a table of information. This is because a table can have one or more indexes. A fully defined index means all index information is selected by a user. Thus, only that information needs to be presented to the user interface. When a partially defined index is created, on the other hand, a table of information is presented to the user interface. Although the SNMP indexing class 70 is illustrated, below, in terms of displaying port information, dynamic dialogs using this class 70 can be implemented for other SNMP MIB data that may be provided in a table.

As a simple example, suppose an example MIB contains information about the ports on a hub. Suppose a retrieval of the MIB data provides four types of information: a stack number, a port number, a port name, and a port state. If the hub contains two stacks and four ports for each stack, the MIB data may provide the following information:

| stack number | port number | port name | port state |
|---|---|---|---|
| 1 | 1 | port1 | 0 (off) |
| 1 | 2 | port2 | 1 (on) |
| 1 | 3 | port3 | 0 (off) |
| 1 | 4 | port4 | 0 (off) |

-continued

| stack number | port number | port name | port state |
| --- | --- | --- | --- |
| 2 | 1 | port5 | 1 (on) |
| 2 | 2 | port6 | 1 (on) |
| 2 | 3 | port7 | 0 (off) |
| 2 | 4 | port8 | 1 (on) |

(The foregoing information is not provided in the normal MIB syntax, but rather in a form understandable for illustration of how the indexing class 70 works.) If the index requires both the stack number and the port number, then a fully defined index includes both pieces of information. Thus, if the user specifies a request for MIB data for stack 2, port 1, the response in the disclosed embodiment is:

| stack number | port number | port name | port state |
| --- | --- | --- | --- |
| 2 | 1 | port5 | 1 (on) |

In contrast, if the user specifies a request for MIB data for stack 2 only, this is only a partially defined index. Thus, in the disclosed embodiment, the dynamic dialog indexing class 70 instead responds with:

| stack number | port number | port name | port state |
| --- | --- | --- | --- |
| 2 | 1 | port5 | 1 (on) |
| 2 | 2 | port6 | 1 (on) |
| 2 | 3 | port7 | 0 (off) |
| 2 | 4 | port8 | 1 (on) | which is an entire table of information about stack 2.

Figure 19:
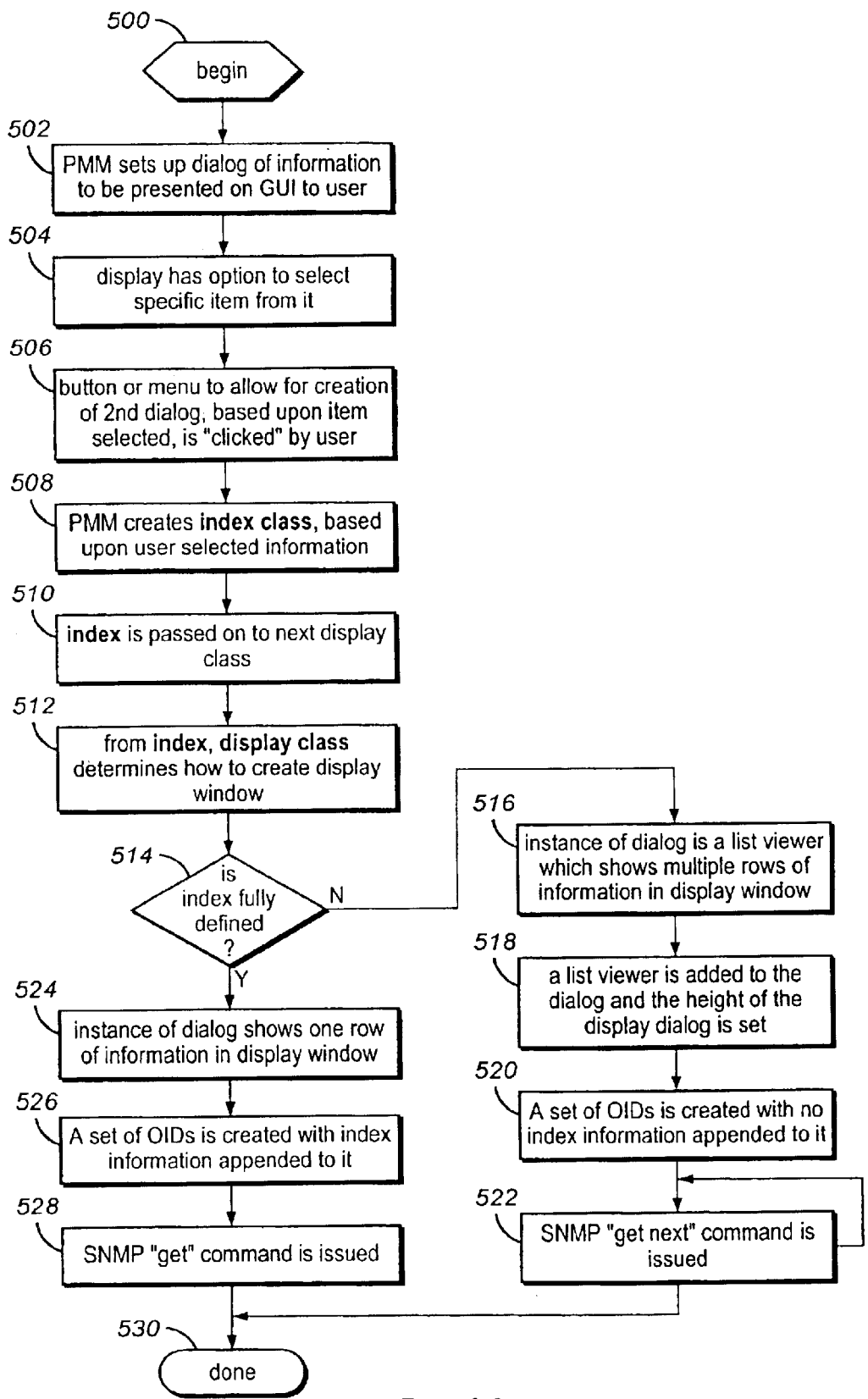
FIG. 19 is a flow diagram depicting the steps taken according to one embodiment of the dynamic dialog indexing class.

FIG. 19 is a flow diagram showing how the dynamic dialog indexing class 70 provides the appropriate dialog in response to a user request. The process begins at step 500. At step 502, the PMM sets up a dialog of information to be presented on the graphical user interface to the user. Then, at step 504, the display has an option that permits selection of a specific item from it. For example, the user may select a port, an LED, or some item from a list. Then, at step 506, a button or menu which allows for the creation of a subsequent dialog, based upon the item selected in step 504 is "clicked" by the user.

At this point, shown as step 508, the PMM creates an index class which is comprised of the information selected by the user. So, if the user selects "port_3," for example, a fully defined index class is created for that MIB table which contains information necessary to fully identify port_3. (A SNMP retrieval of the MIB information for port_3 is made at this point.) At step 510, the index is passed on to the next display class. The display class determines, from the index, how to create a new display window, shown at step 512.

In one embodiment, the contents of the index are scrutinized to present either a list, as the list 494 shown in FIG. 18*b*, or no list, as the dialog 482 of FIG. 18*a*. However, the index class may instead include the results of user selection about which dialog attributes to display, if desired. In the disclosed embodiment, at step 514, a query is made as to whether the index is fully defined. What constitutes a fully defined index depends on the MIB object selected.

If the index is fully defined, control proceeds to step 524, where the instance of the dialog shows one row of information in the display window. Then, at step 526, a set of object identifiers is created, along with index information appended to it. Following this, at step 528, an SNMP "get" command is issued such that the row of information in step 524 can be populated with real-time data. The process completes, for a fully defined index, at step 530.

If, instead, the index is not fully defined, control proceeds to step 516, where the instance of the dialog is a list viewer which shows multiple rows of information in the display window, such as seen in FIG. 18*b*. Then, at step 518, a list viewer is added to the dialog and the height of the display dialog is set. Next, control proceeds to step 520, where a set of object identifiers, representing the data from a MIB on the end device, is created. Because the index information is not fully defined, nothing is appended to the requesting identifiers, as was done in step 526. Then, at step 522, an SNMP "get next" command is issued repeatedly until all the requested SNMP MIB data is received. The process of dynamically presenting a dialog, for a partially defined index, is thus complete at step 530.

Although the SNMP dynamic dialog indexing class 70 is described in terms of the retrieval and display of SNMP-gathered data, the method described herein can be extended to other programs which process and display database information. For example, a program which provides access to household information for a major metropolitan city can use the features of the indexing class 70 to provide either specific or general information, depending upon the user request or other criteria. Because the indexing class 70 greatly simplifies how such information is displayed, the class 70 can be useful for other non-network management programs which retrieve information from a database, format it, and display it on a graphical user interface.

SNMP Evaluator Object

Referring again to FIG. 2, another feature of the intelligent PMM API 112 is an SNMP evaluator object 60. Like the previous two features of the intelligent PMM API 112, the dynamic graphic image layering object 50 and the dynamic dialog indexing class 70, the SNMP evaluator object 60 simplifies the work associated with creating and updating graphical images on the user interface for the PMM developer.

The SNMP evaluator object 60 is a tool which provides efficient retrieval and display of MIB information as a graphical display. Ideally, the graphical display is an accurate image of the supported device to a user. Due to the number of LEDs and optional modules in a typical PMM, there are many possible permutations of displays. The number of LEDs which must be "lit" and the color of a "lit" LED are a couple of considerations when displaying the device graphic. The information needed to decide how the display looks are available as a result of SNMP requests, which are in the form of SNMP MIB objects.

So, to display a graphic of a device, the PMM developer submits a series of SNMP requests to the device agent, retrieves the SNMP MIB objects, and, based upon the results, displays the appropriate image to a user. The PMM developer ends up writing a tremendous amount of code to handle every possible set of SNMP responses. Further, the developer may end up designing multiple front-panel images in anticipation of possible SNMP responses, rather than dynamically "painting" a single front-panel image with proper LED colors, and the like.

The SNMP evaluator object 60 is made up of classes which allow the developer to associate an SNMP MIB object (and a "bit" within the response) with a given image and location for that image. Once the PMM developer has made this association, the correct image is automatically loaded and displayed, based upon the value of the SNMP MIB object. This simplifies the work for the PMM developer and still provides for a very flexible system for dynamically updating a front panel display, based on MIB object values.

Figure 20A:
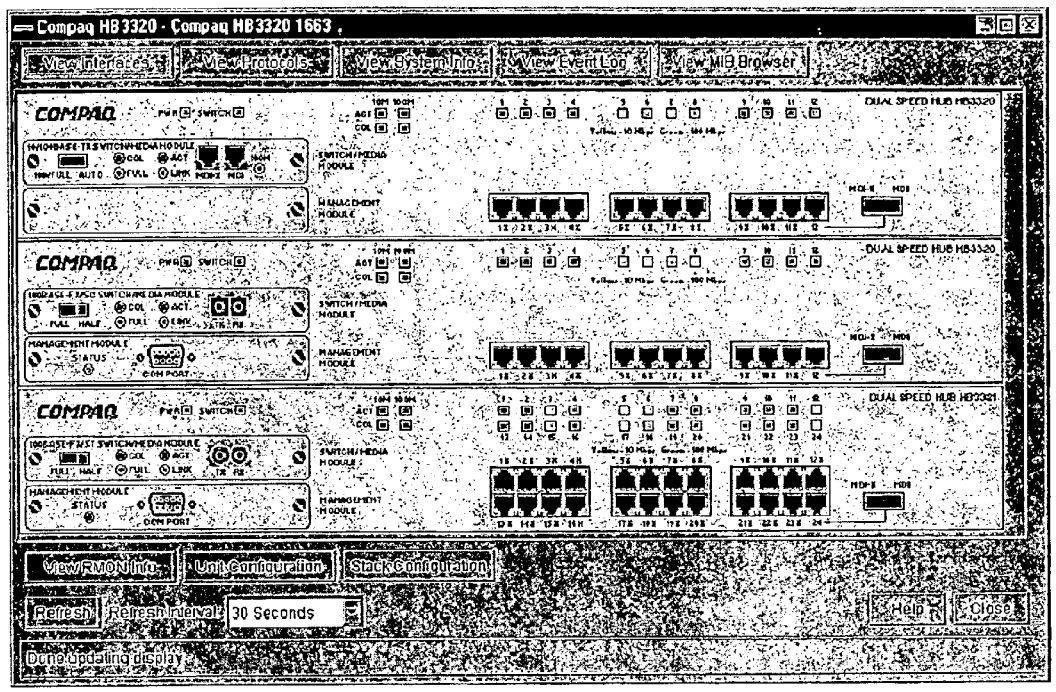
FIG. 20a is a sample screen shot of a device display window according to one embodiment, used to illustrate an SNMP evaluator object of the illustrative system.
Figure 20B:
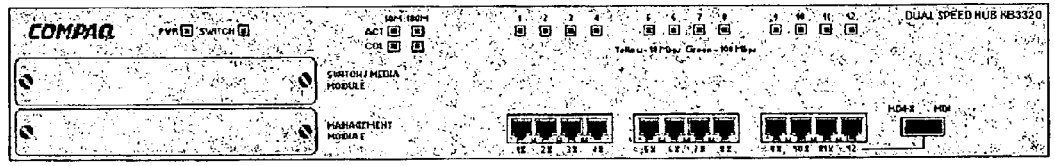
FIG. 20b is a second sample screen shot of a device display of FIG. 20a before any updates to the dialog have been made.
Figure 20C:
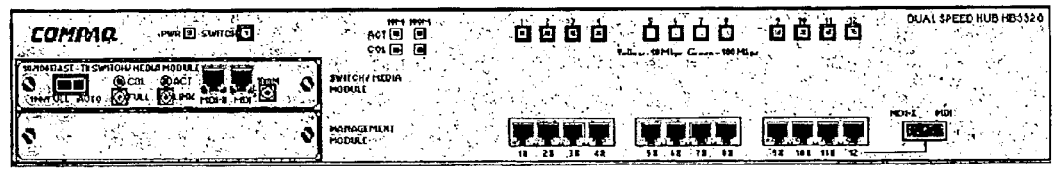
FIG. 20c is a third sample screen shot of a device display of FIG. 20a once updates to hot spots which are based upon SNMP-gathered data have been made.

FIGS. 20a, 20b, and 20c are three examples of display windows using the SNMP evaluator object 60. First, FIG. 20a shows a display window for a Compaq HB3320 12-port, dual-speed fast Ethernet hub. The display window generated by the PMM is a graphic that is representative of the device being supported by the PMM. FIG. 20b shows the underlying picture before any dynamic images have been added, a static image. This is the starting point for creating an image that dynamically represents the status of the HB3320 hub device. Then, FIG. 20c shows the same unit that is shown in FIG. 20b, but this time with dynamic images 532, which are unit panels representing "jacks" and other visual representations of the device, and 534, which represent LEDs for the twelve ports.

According to one embodiment, the SNMP evaluator object 60 is made up of Java classes which the PMM developer can use to dynamically present an image to the user interface. The Java classes are used to map images onto other images based on the results of an SNMP query. Two classes are used by the SNMP evaluator object 60: one which performs Boolean operations upon SNMP MIB data and one which performs bit mask operations upon SNMP MIB data.

A first class, called PmmSnmpHotSpot class, was described above in conjunction with the dynamic graphic image layering object 50 of FIG. 2. The PmmSnmpHotSpot class allows for mapping of SNMP data retrieved from a device and the subsequent display of graphic images, LEDs, and the like, on a base layer, a PmmUnitPanel. The PmmSnmpHotSpot class provides support for Boolean logic that lets an image be placed based on the value of one or more SNMP MIB objects. This class allows for one or more SNMP object identifiers to be compared to known values (or states) to make a display determination. In the disclosed embodiment, the display is then built using simple methods: startIf( ), addAndTerm( ), addOrTerm( ), and endIf( ). As described in FIG. 21, below, these methods build a logical display choice.

A second class, called PmmBitmaskHotSpot class, provides support for bit mask operations that permits display of multiple images, such as LEDs, based upon the value of a single MIB object. The PMM developer specifies a MIB object that returns some integer or other value. The PMM developer then adds several clauses that contain a start-bit index and a bit mask to compare against the bit range in the returned value. Finally, with each clause, the developer specifies a "match" and a "no match" image. The "match" image is drawn if the bit mask matches the bit range in the returned value. Otherwise, the "no match" image is drawn. Both the "match" and "no match" mages can be left blank if the PMM developer wants no image to be drawn in that case.

As an example, suppose the SNMP request returned MIB data which is converted to 32 bits of information. (As with the indexing class 70, described above, this explanation does not use the normal MIB syntax, but is simplified for illustrative purposes.) If eight ports are represented by this MIB information, then each port is described using four bits. So, suppose each 4-bit portion of the 32-bit sequence is defined as follows:

| bit | meaning |
|-----|---------|
| 1 | port state (1 = on, 0 = off) |
| 2 | duplex mode (1 = half, 0 = full) |
| 3 | speed (1 = 100 Meg, 0 = 10 Meg) |
| 4 | link status (1 = link, 0 = no link) |

So, a bit mask of "0101" is used to identify a port that is on, is in half duplex mode, is running at a speed of 10 Meg, and is linked. A bit mask of "1010," by contrast, identifies a port that is off, is running in full duplex mode, runs at a speed of 100 Meg, and is not linked.

Figure 21:
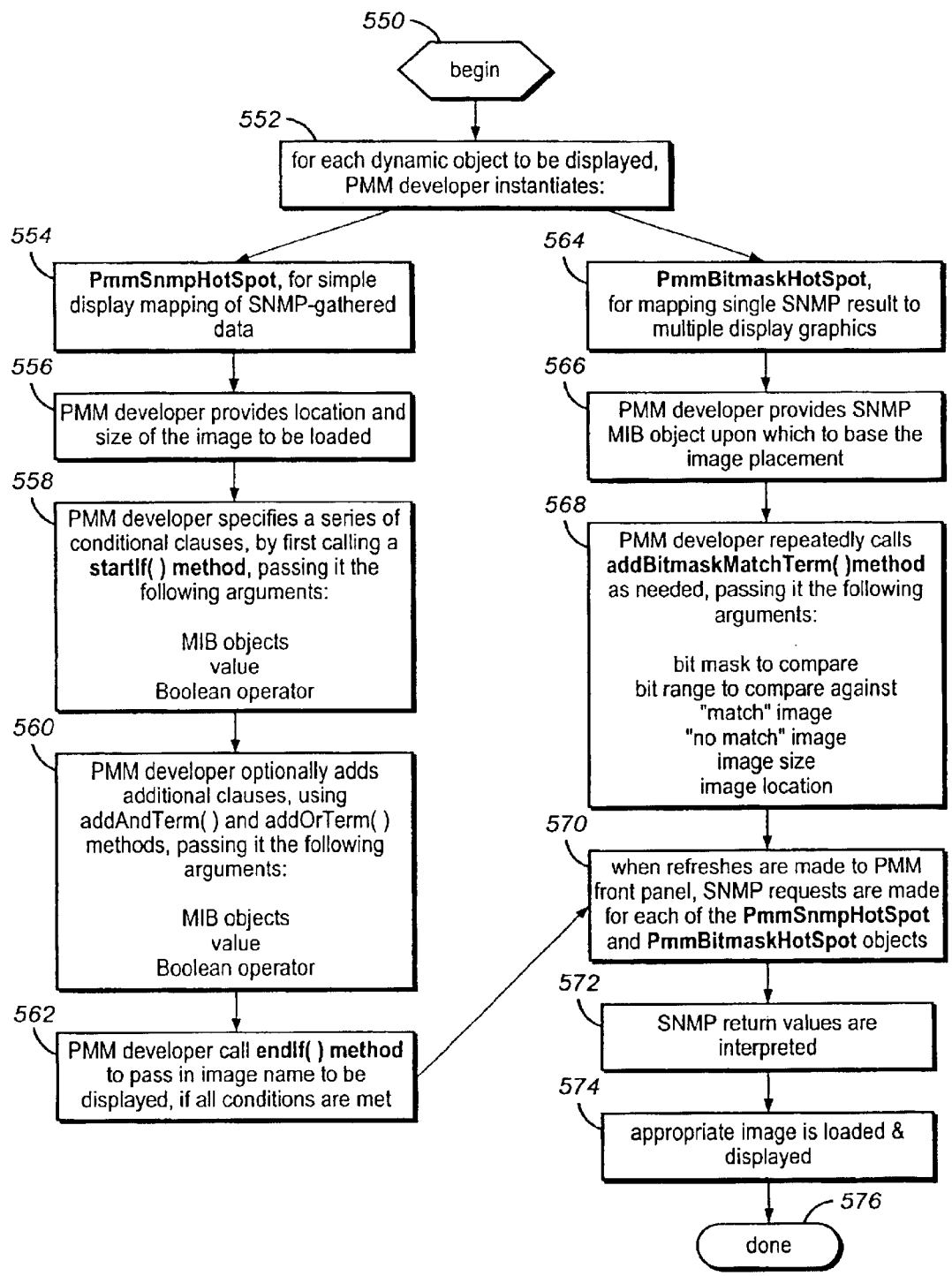
FIG. 21 is a flow diagram used to illustrate the steps taken according to one embodiment of the SNMP evaluator object of the illustrative system.

FIG. 21 is a flow diagram depicting how the SNMP evaluator object 60 operates according to one embodiment. The process begins at step 550. Step 552 shows that, for each dynamic object to be displayed, the PMM developer first instantiates one of two possible objects: a PmmSnmpHotSpot object and/or a PmmBitmaskHotSpot object. The flow diagram of FIG. 21 diverges to one of two possible paths, based upon which of these two objects is being used.

The PmmSnmpHotSpot object is used by the PMM developer for simple display mapping of SNMP-gathered data, shown at step 554. First, at step 556, the PMM developer provides the location and size of the image to be loaded. Then, at step 558, the PMM developer specifies a series of conditional clauses. This is done by first calling a startIf method and passing it the following arguments: a MIB object, a value, and a Boolean operator, such as "equal to" or "greater than." Next, at step 560, the PMM developer adds additional clauses, as needed, by using an addAndTerm( ) method or an addOrTerm( ) method. As with the startIf( ) method, the MIB objects, value, and Boolean operator arguments are passed to these methods. Finally, at step 562, the PMM developer calls an endIf( ) method and passes to it an image name to be displayed on the graphic if the conditions defined by the specified conditional clauses are met.

A second object may be instantiated in addition to or instead of the PmmSnmpHotSpot object. Shown at step 564 of FIG. 21, a PmmBitmaskHotSpot object is instantiated for mapping a single SNMP result to multiple display graphics, such as LEDs. Control proceeds to step 566, where the PMM developer provides an SNMP MIB object upon which to base the image placement. Then, at step 568, the PMM developer repeatedly calls an addBitmaskMatchTerm( ) method, as needed. The method is called once for each display graphic needed. The following arguments are passed to the method: bit mask to compare, bit range to compare against, a "match" image, a "no match" image, the image size, and the image location. The "match" and "no match" images can optionally be left blank. This completes the "initialization" required by the PMM developer.

The next steps show what happens when an image is updated. At step 570, upon "refresh" of the graphic display, SNMP requests are made for each of the aforementioned PmmSnmpHotSpot and PmmBitmaskHotSpot objects. At step 572, the responses to the SNMP requests are interpreted, based upon the arguments specified, above. Finally, at step 574, the appropriate image is loaded and displayed for the user. The dynamic display of the image is complete at step 576.

Although described in terms of the gathering and display of SNMP MIB data, the SNMP evaluator object 60 can be extended to other types of data gathering and display, not limited to network management programs. For example, a program which takes database information and displays it in graphical form may benefit from the method described herein. Further, programs which simply gather database information and display the data as retrieved may be expanded to graphically represent such data using the evaluator object 60, where useful, making the software more attractive to users.

Conclusion

The intelligent PMM API may readily support additional features. The disclosed features simplify much of the work, for developers both of the product management modules and network management software itself. By addressing the support of multiple operating environments by network management software, the intelligent PMM API encourages support of additional operating environments. Further, the features described, above, reduce the complexity of PMM development generally and give the network management software a consistent look and feel, both of which benefit the end user. In addition, such features significantly reduce the amount of work to be done in bringing a PMM to market.

The various features of the intelligent PMM API are written using the Java programming language. However, the features described herein may be applied to systems written in other programming languages.

The foregoing disclosure and description of the various embodiments are illustrative and explanatory thereof, and various changes in the number and type of environments, the descriptions of classes, attributes, functions, objects and methods, the organization of the software components, dialog representations, and the order and timing of steps taken, as well as in the details of the illustrated software may be made without departing from the spirit of the invention.

We claim:

1. A network management environment, comprising:

a plurality of management modules adapted to interface with device agents of manageable devices, wherein each of the plurality of management modules is operating environment independent;

a management module application programming interface coupled to the plurality of management modules to interface each of the plurality of management modules to any one of a plurality of operating environments; and an operating environment application programming interface coupled between the plurality of management modules and network management software and comprising a plurality of management module environment personalities, wherein each of the plurality of management module environment personalities corresponds to a respective operating environment and is configured to interface each of the plurality of management modules with the network management software, through the respective operating environment.

2. The network management environment of claim 1, comprising a network management software coupled to the operating environment application programming interface, the network management software adapted to send operating environment-independent requests to the management modules via the operating environment application programming interface, wherein the network management software has an SNMP stack.

3. The network management environment of claim 1, the management module application programming interface comprising:

an intelligent SNMP object to create a gateway between a management module of the plurality of management modules and an operating environment of the plurality of operating environments.

4. The network management environment of claim 1, the management module application programming interface comprising:

an intelligent button object to control a button on a graphical user interface of the network management independent of an operating environment of the plurality of operating environments.

5. The network management environment of claim 1, the management module application programming interface comprising:

an intelligent help button object to access a help provider corresponding to a current operating environment of the plurality of operating environments.

6. The network management environment of claim 1, the management module application programming interface comprising:

an intelligent image loading object to load an image based upon a current operating environment of the plurality of operating environments, wherein the image is identified independent of the current operating environment.

7. The network management environment of claim 1, the network management environment including a graphical user interface and a networking device, the management module application programming interface comprising:

a dynamic graphic image layering object to create an ordered arrangement of image objects including a base layer and a plurality of additional layers in response to a request to display a graphical representation of the networking device.

8. The network management environment of claim 1, the management module application programming interface comprising:

an SNMP dynamic dialog indexing object to display a dialog containing a row of SNMP MIB data in response to a particular selection of MIB data and to display a dialog containing a table of SNMP MIB data in response to a general selection of SNMP MIB data.

9. The network management environment of claim 1, the management module programming interface comprising:

an SNMP evaluator object to perform a Boolean operation to place an image representing real-time SNMP MIB data in response to a request to evaluate SNMP MIB data.

10. The network management environment of claim 1, the management module programming interface comprising:

an SNMP evaluator object to perform a bit mask operation to place an image representing real-time SNMP MIB data in response to a request to evaluate SNMP MIB data.

11. The environment of claim 1, further comprising:

a network coupled to the management module application programming interface; and a plurality of network manageable devices coupled to the network.

* * * * *